US010815682B2

(12) United States Patent
Colino Vega

(10) Patent No.: US 10,815,682 B2
(45) Date of Patent: Oct. 27, 2020

(54) VERTICAL FORMWORK ANCHOR WITH FIXING KEY TO FIX TO A VERTICAL FORMWORK PANEL

(71) Applicant: ULMA C y E, S. Coop., Oñati (ES)

(72) Inventor: Manuel Colino Vega, Vitoria-Gasteiz (ES)

(73) Assignee: ULMA C Y E, S. COOP., Oñati (ES)

( * ) Notice: Subject to any disclaimer, the term of this patent is extended or adjusted under 35 U.S.C. 154(b) by 0 days.

(21) Appl. No.: 16/852,901

(22) Filed: Apr. 20, 2020

(65) Prior Publication Data

US 2020/0248467 A1 Aug. 6, 2020

Related U.S. Application Data

(63) Continuation of application No. 16/218,993, filed on Dec. 13, 2018, now Pat. No. 10,662,660, which is a (Continued)

(30) Foreign Application Priority Data

Jun. 17, 2016 (EP) .................................... 16382282

(51) Int. Cl.
*E04G 17/065* (2006.01)
*F16B 5/10* (2006.01)
(Continued)

(52) U.S. Cl.
CPC ............ *E04G 17/0652* (2013.01); *F16B 5/10* (2013.01); *F16B 21/02* (2013.01); *E04G 2009/028* (2013.01); *F16B 41/002* (2013.01)

(58) Field of Classification Search
CPC ......... E04G 17/0652; F16B 21/02; F16B 5/10
(Continued)

(56) References Cited

U.S. PATENT DOCUMENTS 4,899,978 A 2/1990 Gates
8,220,772 B2 * 7/2012 Schwoerer .......... E04G 17/0657
249/216
(Continued)

FOREIGN PATENT DOCUMENTS

DE 4207749 C1 4/1993
EP 2875195 A1 5/2015
(Continued)

OTHER PUBLICATIONS

International Search Report and Written Opinion in corresponding International Application No. PCT/EP2017/058195, dated May 10, 2017.
(Continued)

*Primary Examiner* — Michael Safavi
(74) *Attorney, Agent, or Firm* — Edell, Shapiro & Finnan, LLC

(57) ABSTRACT

According to one embodiment an anchor for a vertical formwork is provided that includes a fixed part suitable for being fixed to a formwork panel and fixing means for fixing the fixed part to the formwork panel. The fixing means includes a fixing key suitable for being housed in a hole of the formwork panel, the fixing key comprising an off-centered stop with respect to the axis of rotation of the fixing key, such that in a first angular position the off-centered stop of the fixing key can be introduced in the hole of the formwork panel and in a second angular position the off-centered stop is retained by the formwork panel, and therefore the anchor is fixed to the formwork panel.

13 Claims, 24 Drawing Sheets

Related U.S. Application Data continuation of application No. PCT/EP2017/058195, filed on Apr. 6, 2017.

(51) Int. Cl.
  *F16B 21/02* (2006.01)
  *E04G 9/02* (2006.01)
  *F16B 41/00* (2006.01)

(58) Field of Classification Search
  USPC .............................................. 249/40, 42, 43
  See application file for complete search history.

(56) References Cited

U.S. PATENT DOCUMENTS

| | | | | |
|---|---|---|---|---|
| 9,580,922 | B2* | 2/2017 | Hagemes | ............ E04G 17/0652 |
| 2004/0079860 | A1* | 4/2004 | Ward | .................... E04G 17/045 |
| | | | | 249/33 |
| 2008/0173788 | A1* | 7/2008 | Brewka | .................. E04G 11/10 |
| | | | | 249/189 |
| 2010/0059655 | A1 | 3/2010 | Schwoerer | |
| 2012/0304570 | A1* | 12/2012 | Braun | ...................... E04G 17/06 |
| | | | | 52/426 |
| 2014/0374568 | A1* | 12/2014 | Amon | .................. E04G 17/0652 |
| | | | | 249/1 |
| 2015/0167329 | A1* | 6/2015 | Hagemes | ............. E04G 17/0652 |
| | | | | 52/745.21 |
| 2017/0002575 | A1* | 1/2017 | Dingler | ................... E04G 17/14 |

FOREIGN PATENT DOCUMENTS

| | | |
|---|---|---|
| EP | 2126248 B1 | 3/2017 |
| FR | 2231875 A1 | 12/1974 |
| GB | 1468422 | 3/1977 |
| WO | 2014012853 A1 | 1/2014 |

OTHER PUBLICATIONS

Extended European Search Report in corresponding EP Application No. 16382282.8, dated Sep. 30, 2016.

* cited by examiner

VERTICAL FORMWORK ANCHOR WITH FIXING KEY TO FIX TO A VERTICAL FORMWORK PANEL

CROSS-REFERENCE TO RELATED APPLICATIONS

This application relates to and claims the benefit and priority to U.S. application Ser. No. 16/218,993 filed Dec. 13, 2018, which relates to and claims the benefit and priority to International Application NO. PCT/EP2017/058195, filed Apr. 6, 2017, which relates to and claims the benefit and priority to European Application No. EP16382282.8, filed Jun. 17, 2016.

TECHNICAL FIELD

The present invention relates to an anchor for a vertical formwork and to a vertical formwork.

BACKGROUND

The use of vertical formworks for making vertical structures, such as walls, is known. Vertical formworks comprise formwork panels arranged facing one another and fixed to one another by means of tie rods or anchor rods. The vertical formworks comprise anchors for fixing the tie rods to the formwork panels.

EP2126248A1 discloses a vertical formwork in which the anchors are fixed to the corresponding formwork panel by means of a threaded screw.

In order to prevent having to provide threaded holes in the formwork panel, patent document EP2875195A1 discloses a solution in which the threaded screw is replaced with a guided tilted screw housed in a non-threaded hole of the formwork panel.

SUMMARY OF THE DISCLOSURE

A first aspect of the disclosure relates to an anchor for a vertical formwork comprising a fixed part suitable for being fixed to a formwork panel, and fixing means for fixing the fixed part to the formwork panel.

The fixing means comprises a fixing key configured for being housed in a hole of the formwork panel, the fixing key comprising an off-centered stop with respect to the axis of rotation of the fixing key. In a first angular position the off-centered stop of the fixing key can be introduced in the hole of the formwork panel, and in a second angular position the off-centered stop is retained by the formwork panel, and therefore the anchor is fixed to the formwork panel.

A second aspect of the disclosure relates to a vertical formwork comprising two formwork panels which are arranged facing one another, each of the formwork panels comprising at least one hole for fixing an anchor. The vertical formwork also comprises an anchor fixed to each of the formwork panels, the anchor having the features described above.

The fixing means allows fixing the anchor to the formwork panel in an alternatively fast and simple manner.

These and other advantages and features will become evident in view of the drawings and the detailed description.

DETAILED DESCRIPTION

Figure 1:
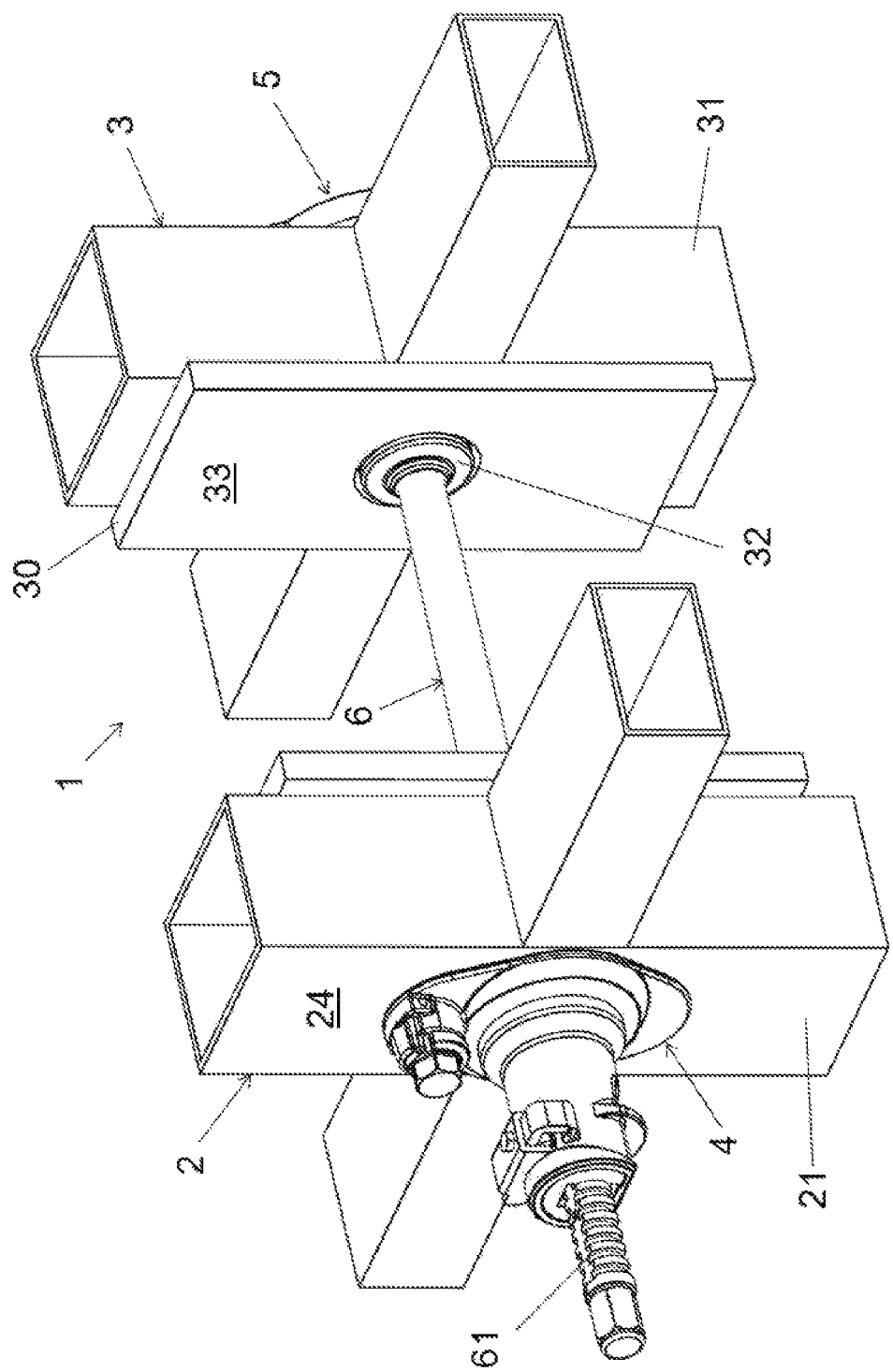
FIG. 1 shows a perspective view of an embodiment of a vertical formwork according to one embodiment.
Figure 2:
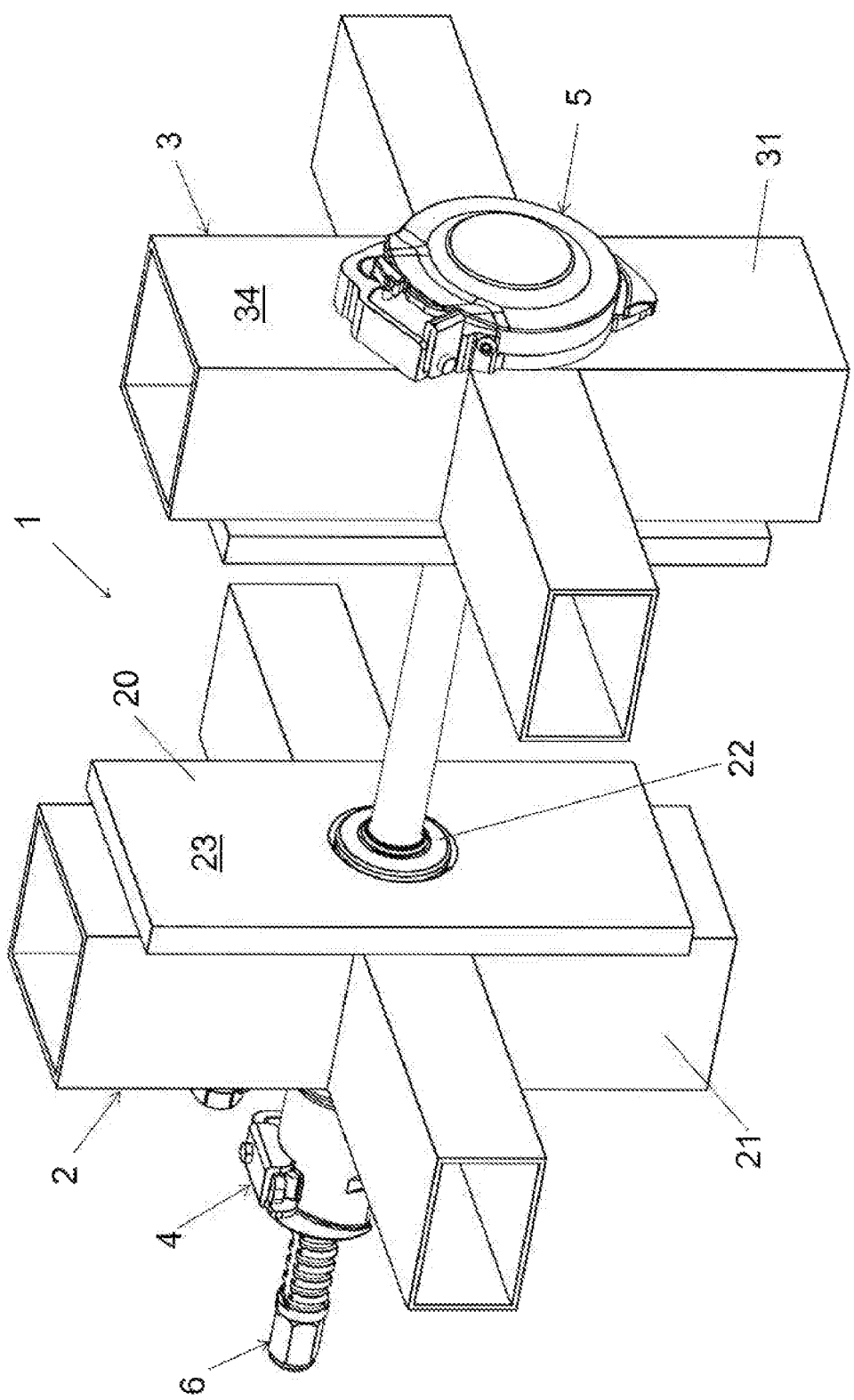
FIG. 2 shows a second perspective view of the vertical formwork of FIG. 1.
Figure 3:
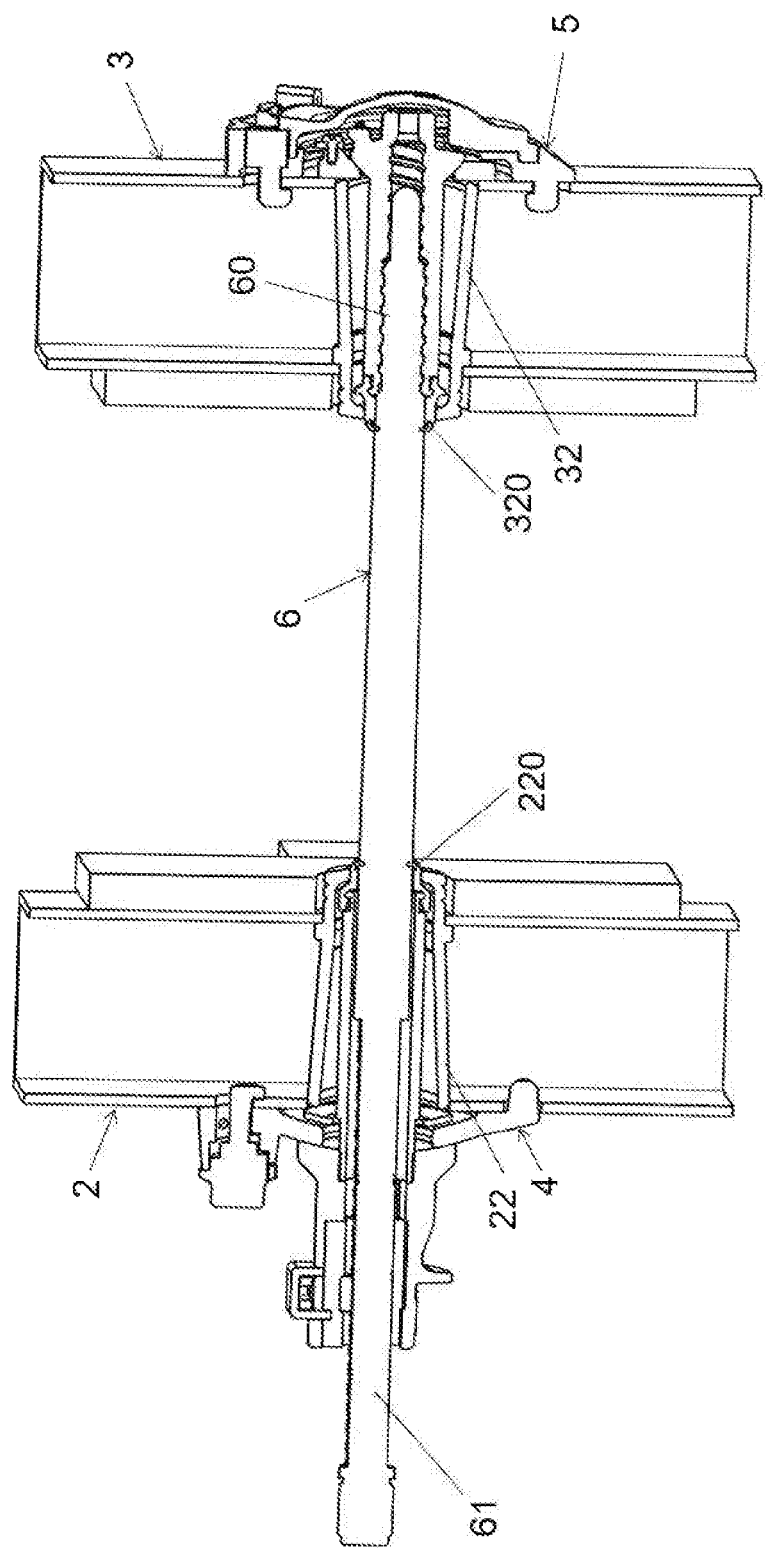
FIG. 3 shows a section view of the vertical formwork of FIG. 1.

FIGS. 1 to 3 show a vertical formwork 1 according to one embodiment.

The vertical formwork 1 comprises a front formwork panel 2 and a rear formwork panel 3 arranged facing one another, a front anchor 4 fixed to the front formwork panel 2 and a rear anchor 5 fixed to the rear formwork panel 3, and a tie rod 6 fixed to the front anchor 4 and to the rear anchor 5.

The vertical formwork 1 of this embodiment is a vertical formwork suitable for being adjusted from one face, i.e., the tie rod 6 can be fixed from one side of the formwork. In systems of this type, the rear anchor 5 is fixed to the rear formwork panel 3 before the front formwork panel 2 and the rear formwork panel 3 are disposed in the concreting position. Once the front formwork panel 2 and the rear formwork panel 3 are positioned in the concreting position, the operator is disposed on the opposite side, fixing the front anchor 4, and fixing the tie rod 6 to the rear anchor 5 and to the front anchor 4. In the context of the present disclosure, the front part will be considered the part where the operator fixing the tie rod 6 it located. Therefore, the formwork panel arranged on the side of the operator is the front formwork panel 2, and the formwork panel facing the front formwork panel 2 is the rear formwork panel 3. Likewise, the anchor fixed to the front formwork panel 2 is the front anchor 4, and the anchor fixed to the rear formwork panel 3 is the rear anchor 5. Furthermore, the inner face 23 and 33 of the formwork panel 2 and 3 will be considered the face suitable for being arranged in contact with the concrete and the outer face 24 and 34 of the formwork panel 2 and 3 will be considered the face opposite the inner face 23 and 33.

In this embodiment, the front formwork panel 2 comprises a structure 21, a board 20 fixed to the structure 21, and a housing extending from the outer face 24 to the inner face 23 while the rear formwork panel 3 comprises a structure 31, a board 30 fixed to the structure 31, and a housing extending from the outer face 34 to the inner face 33. In this embodiment, a bushing 22 is arranged in the housing of the front formwork panel 2. The bushing 22 forms a housing in which part of the front anchor 4 is housed. The bushing 22 has an inlet opening which is arranged flush with the outer face 24 of the front formwork panel 2, and an outlet opening 220 which is arranged flush with the inner face 23 of the front formwork panel 2, the diameter of the outlet opening 220 being smaller than the diameter of the inlet opening.

In this embodiment the configuration of the rear formwork panel 3 is the same as that of the front formwork panel 2.

In other embodiments, depending on the dimensions of the formwork panel, each formwork panel can comprise a plurality of housings, a respective bushing and anchor being arranged in each of them, such that two facing formwork panels can be fixed to one another through a plurality of tie rods fixed to the anchors.

As mentioned above, the vertical formwork 1 comprises a front anchor 4 suitable for being fixed to the front formwork panel 2 and a rear anchor 5 for being fixed to rear formwork panel 3.

Figure 4:
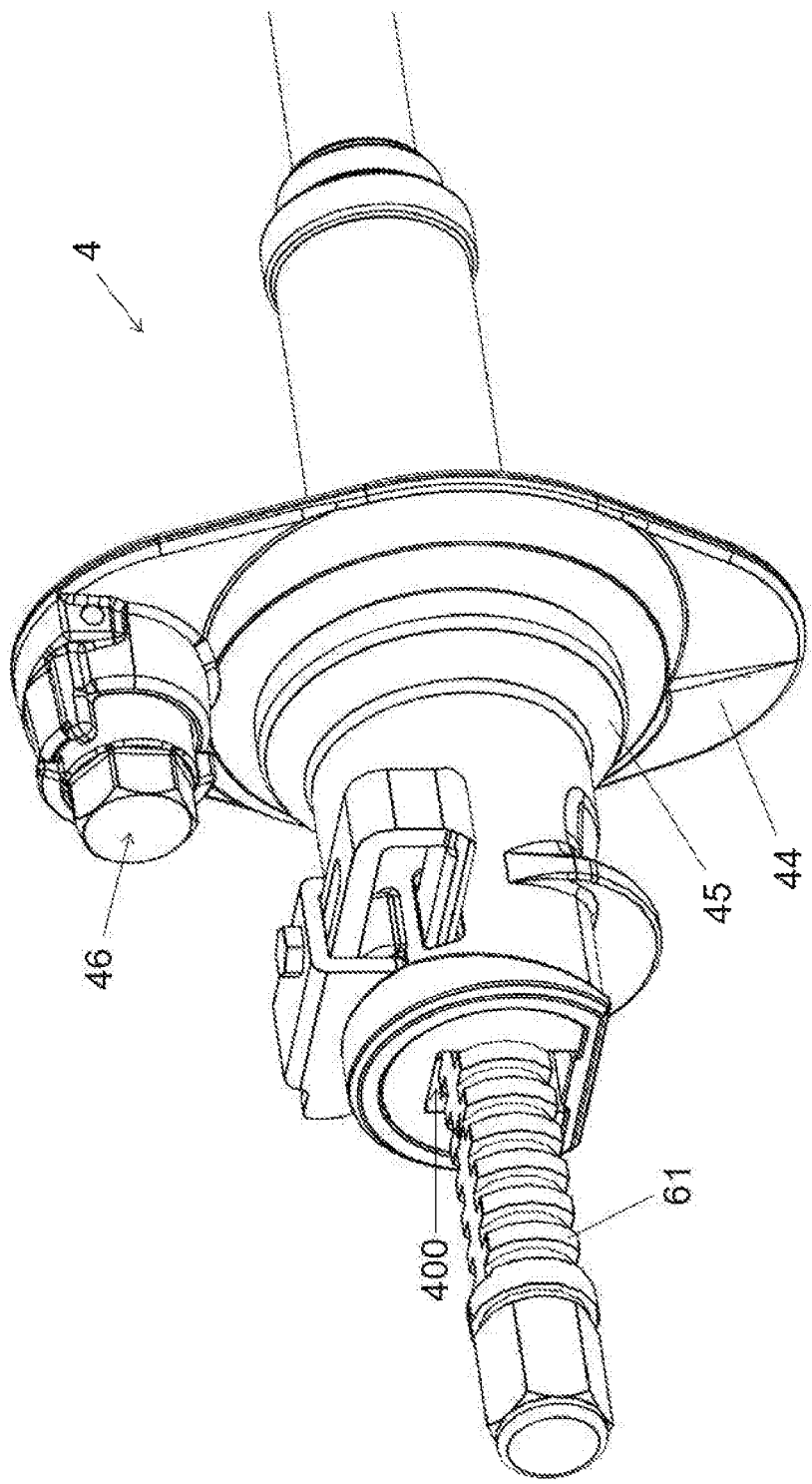
FIG. 4 shows a first perspective view of the front anchor of the vertical formwork of FIG. 1.
Figure 5:
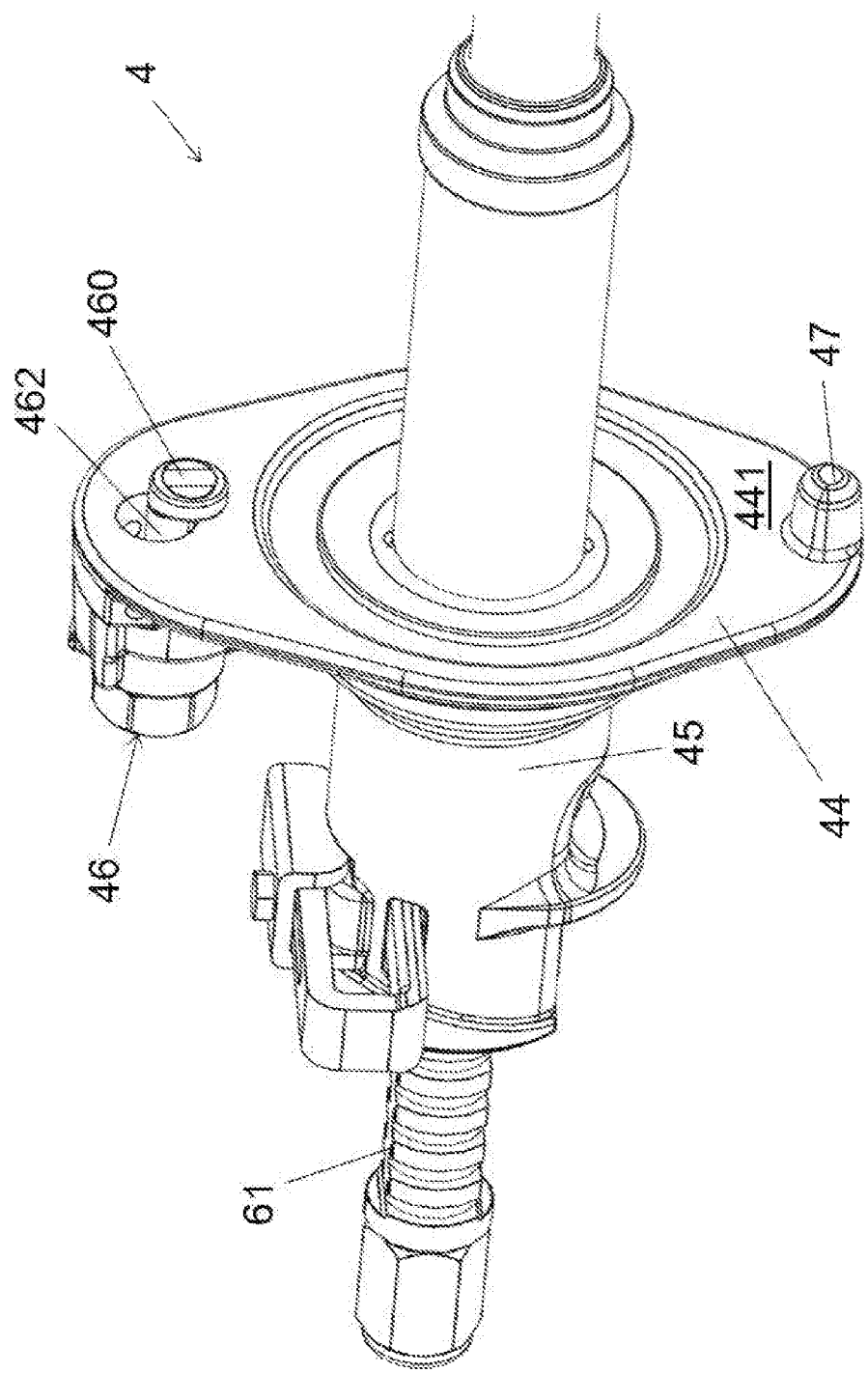
FIG. 5 shows a second perspective view of the front anchor of FIG. 4.
Figure 6:
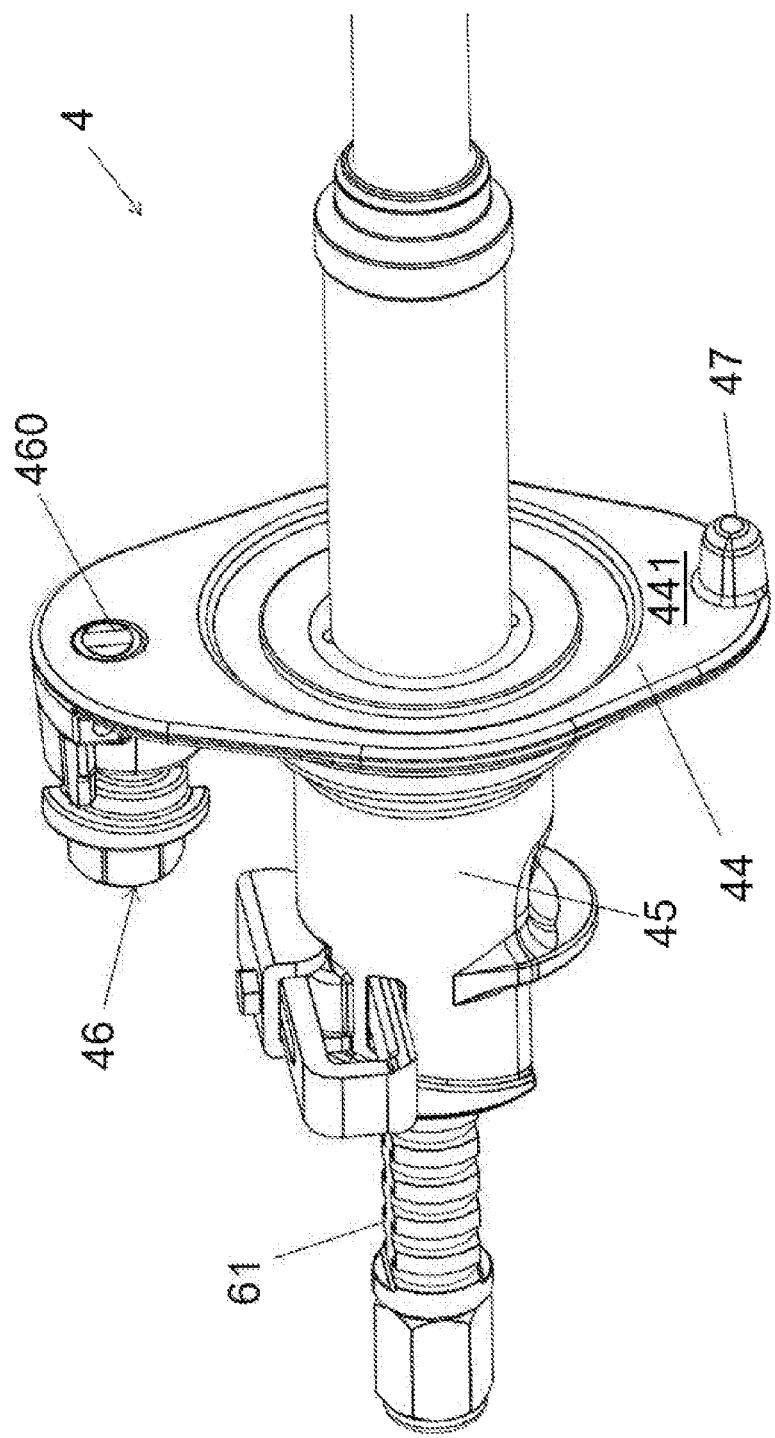
FIG. 6 shows a third perspective view of the front anchor of FIG. 4.
Figure 7:
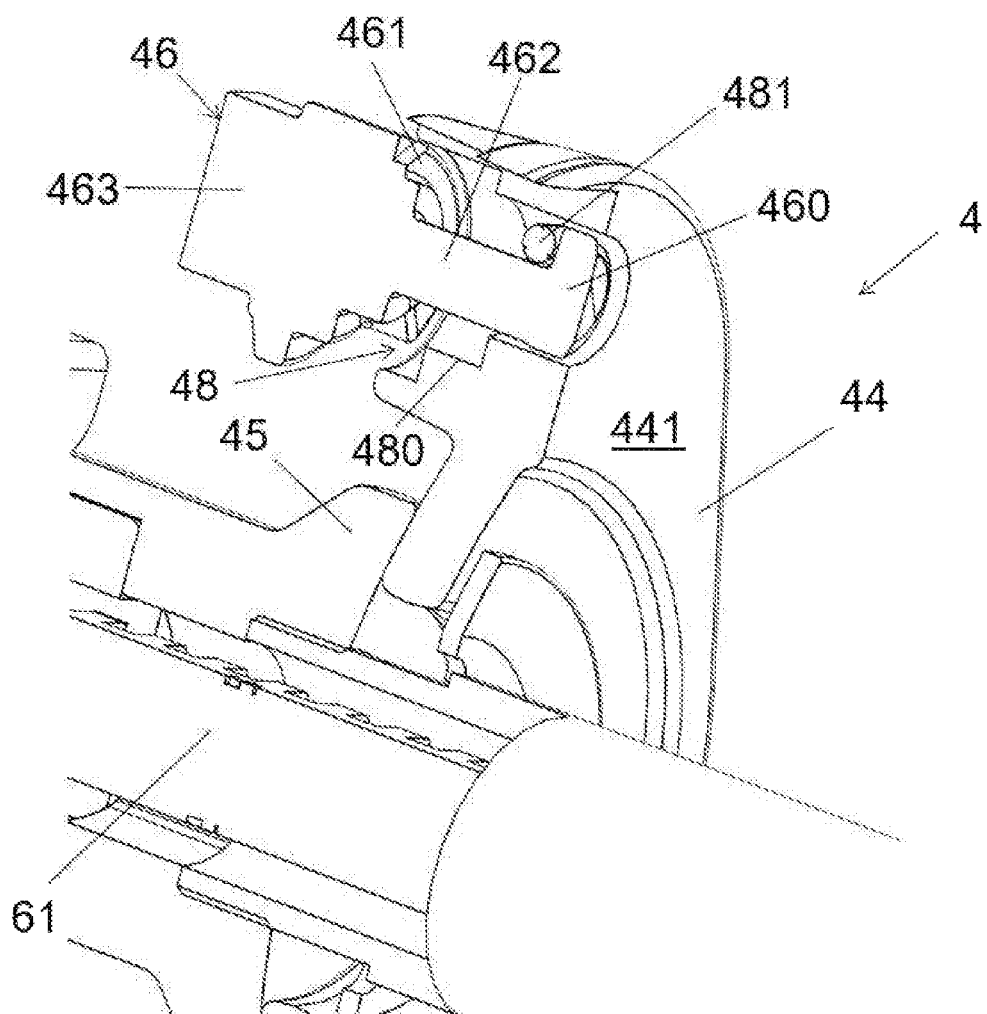
FIG. 7 shows a detailed section view of the front anchor of FIG. 4.
Figure 8:
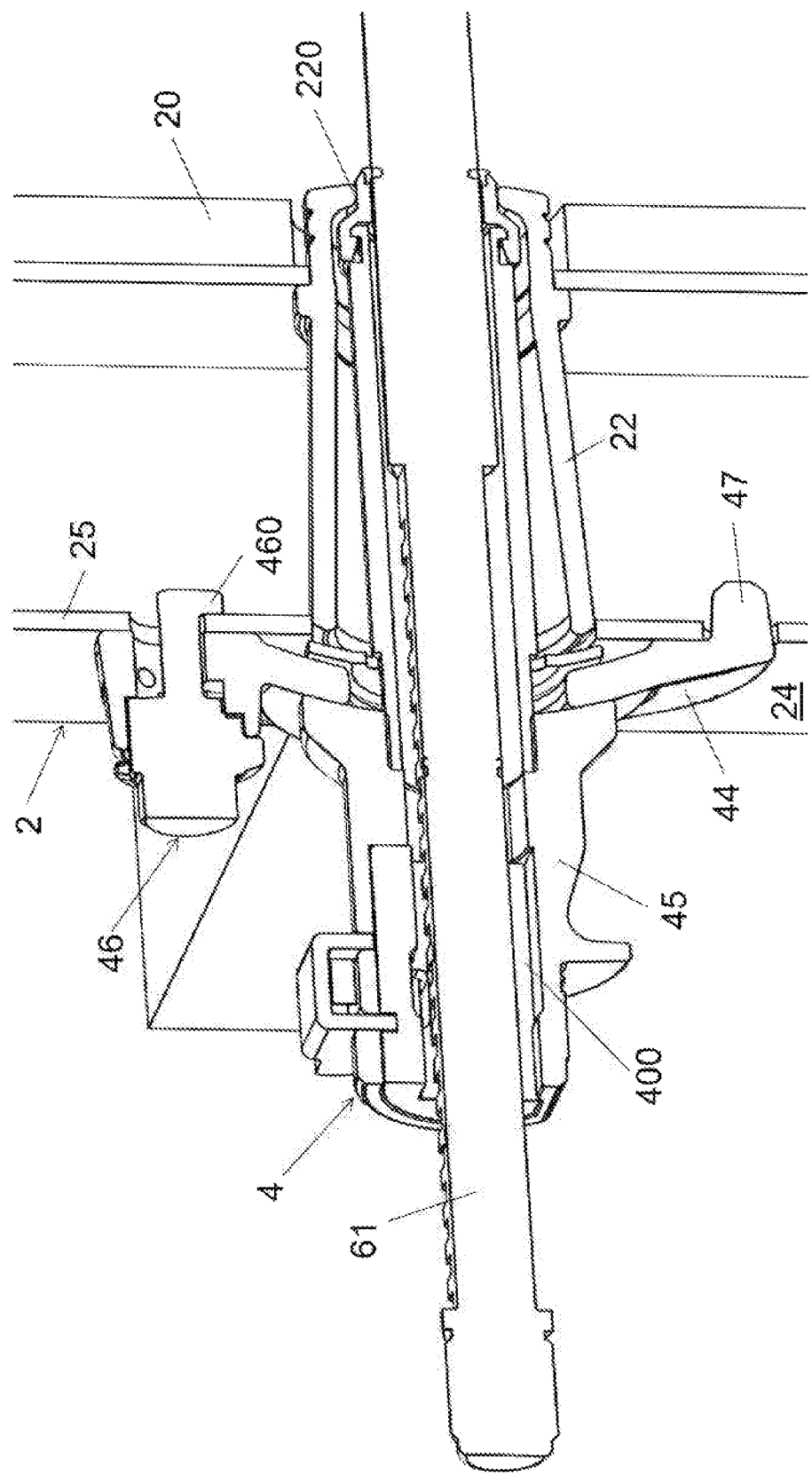
FIG. 8 shows a section view of the front anchor of FIG. 4 fixed to the front formwork panel.

The front anchor 4 of this embodiment, shown in detail in the FIGS. 4 to 6, comprises a housing 400 suitable for receiving a first end of the tie rod 6. The front anchor 4 further comprises a fixed part 44 suitable for being fixed to the front formwork panel 2 and fixing means for fixing the fixed part 44 to the front formwork panel 2.

In this embodiment, the fixed part 44 of the front anchor 4 is supported on a supporting wall 25 of the front formwork panel 2.

The fixing means comprise a fixing key 46 suitable for being housed in a hole 210 of the supporting wall 25 of the front formwork panel 2. The fixing key 46 has the function that the screw has in anchors known in the prior art.

Figure 10:
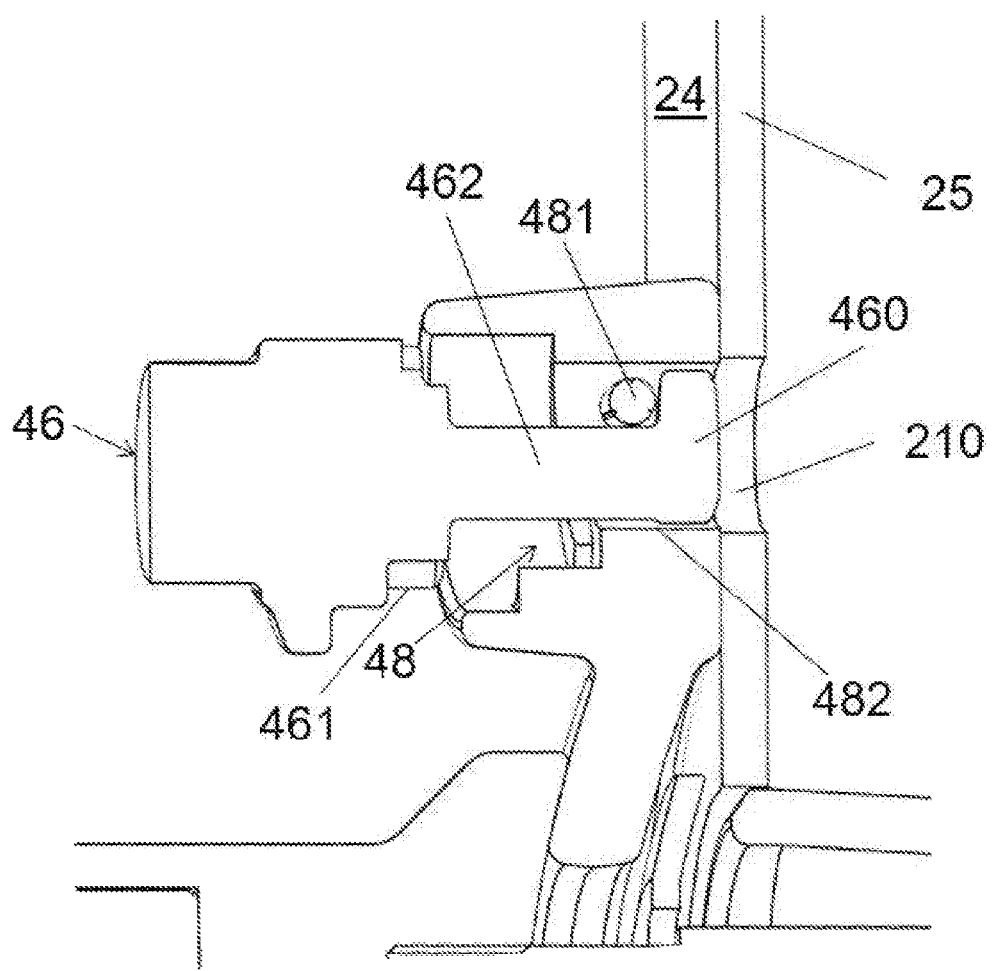
FIG. 10 shows a detailed section view of the front anchor of FIG. 4 supported against the front formwork panel.
Figure 11:
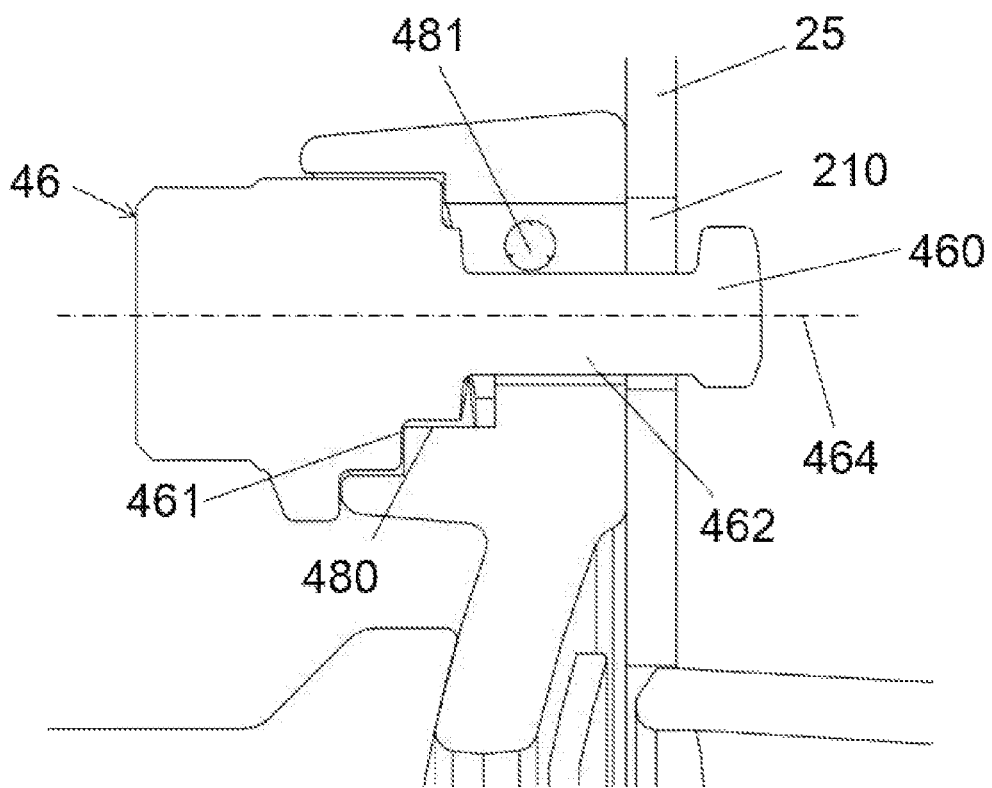
FIG. 11 shows a detailed section view of the front anchor of FIG. 4 with the fixing key housed in the hole of the front formwork panel, the fixing key being in the first angular position.
Figure 12:
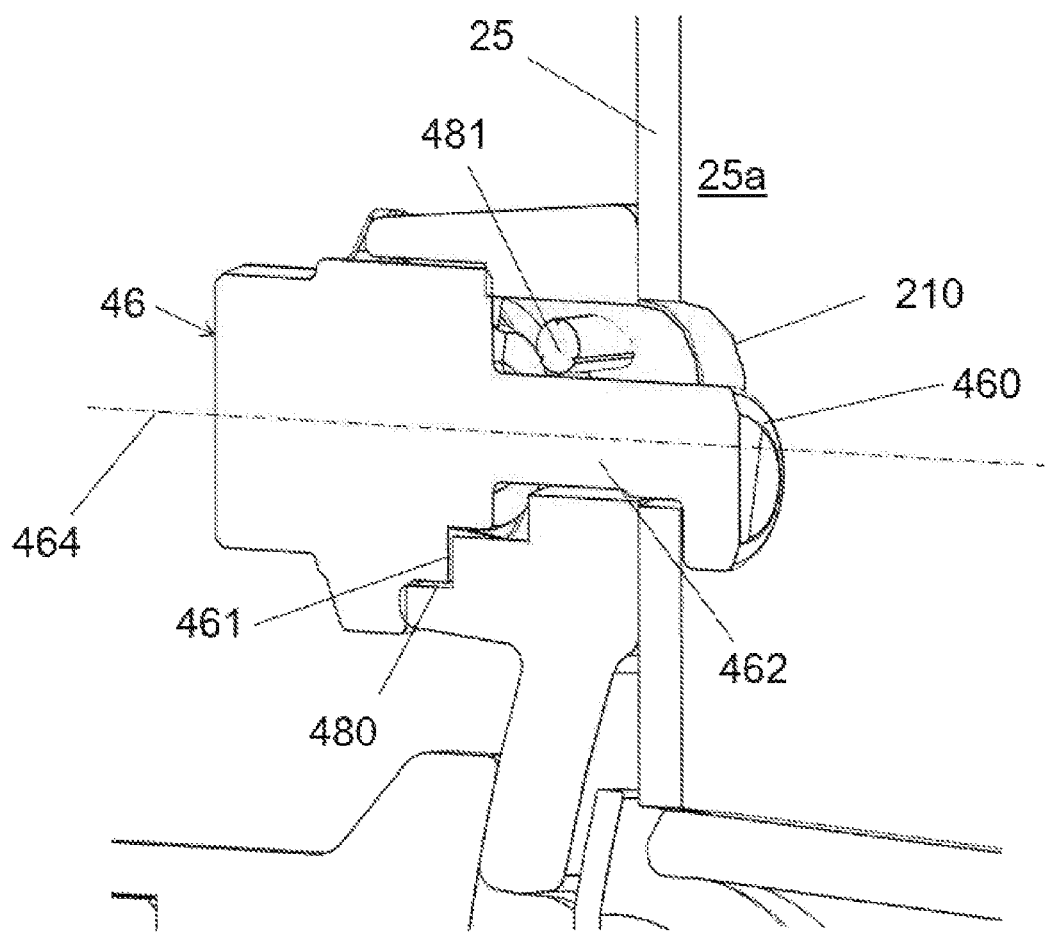
FIG. 12 shows a detailed section view of the anchor of FIG. 4 with the fixing key housed in the hole of the front formwork panel, the fixing key being in the second angular position.

The fixing key 46 comprises an off-centered stop 460 with respect to the axis of rotation 464 of the fixing key 46, such that in a first angular position, shown in detail in FIGS. 10 and 11, the off-centered stop 460 of the fixing key 46 can be introduced in the hole 210 of the supporting wall 25 of the front formwork panel 2, and in a second angular position, shown in detail in FIG. 12, the off-centered stop 460 is retained by the supporting wall 25 of the front formwork panel 2 and therefore the front anchor 4 is fixed to the front formwork panel 2. The hole 210 of the supporting wall 25 of the front formwork panel 2 has a diameter greater than or equal to the diameter of the off-centered stop 460 of the fixing key 46.

Figure 13:
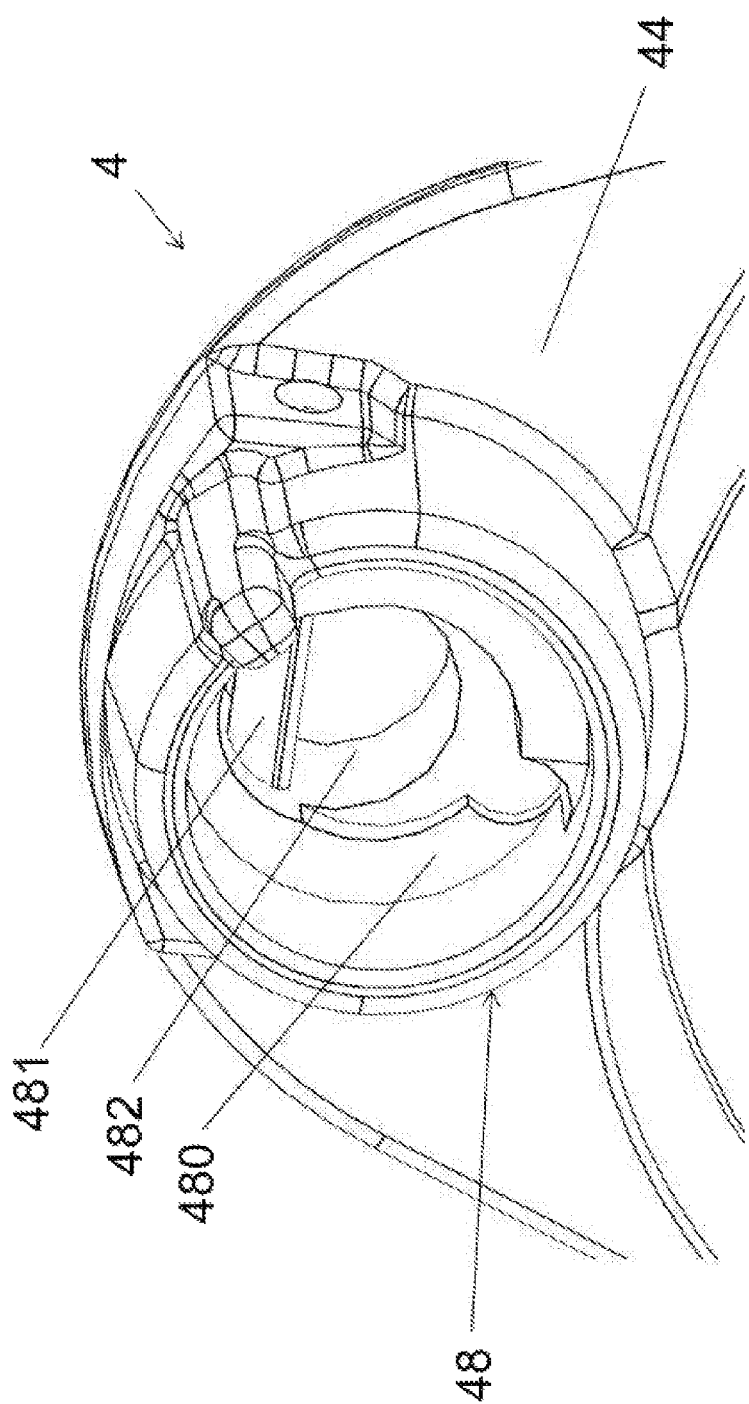
FIG. 13 shows a detailed view of the housing of the front anchor of FIG. 4.

In this embodiment, the fixed part 44 of the front anchor 4 comprises a fixing housing 48, shown in detail in FIG. 13, in which the fixing key 46 is arranged.

In this embodiment, when the fixing key 46 is introduced in the hole 210 of the supporting wall 25 of the front formwork panel 2, in the first angular position, there is a gap between the supporting face 460a of the off-centered stop 460 of the fixing key 46 and the inner face 25a of the supporting wall 25 of the structure 21 of the front formwork panel 2, as shown in FIG. 11. To eliminate the gap, the fixing means comprises backward motion means cooperating with the fixing key 46, such that when the fixing key 46 turns from the first angular position to the second angular position, the backward motion means causes the fixing key 46 to axially move backwards and therefore makes the fixing key 46 to be supported against the supporting wall 25 of the front formwork panel 2 in the second angular position, i.e., the supporting face 460a of the off-centered stop 460 of the fixing key 46 is supported against the inner face 25a of the supporting wall 25 of the structure 21 of the front formwork panel 2.

In this embodiment, the backward motion means comprises a guide surface 480 arranged in the housing 48 of the fixed part 44, and the fixing key 46 comprises a stop surface 461, the guide surface 480 and the stop surface 461 cooperating such that the fixing key 46 moves backwards when turning. In this embodiment, the guide surface 480 and the stop surface 461 are helical surfaces. Once the key is turned from the first angular position to the second angular position, the static friction force between the guide surface 480 of the housing 48 and the stop surface 461 of the fixing key 46 is such that the fixing key 46 is maintained in the second angular position.

In other possible embodiments, the backward motion means may not be necessary and simply by turning the fixing key, the supporting face of the off-centered stop of the fixing key is supported against the inner face of the supporting wall of the structure of the formwork panel.

Figure 9:
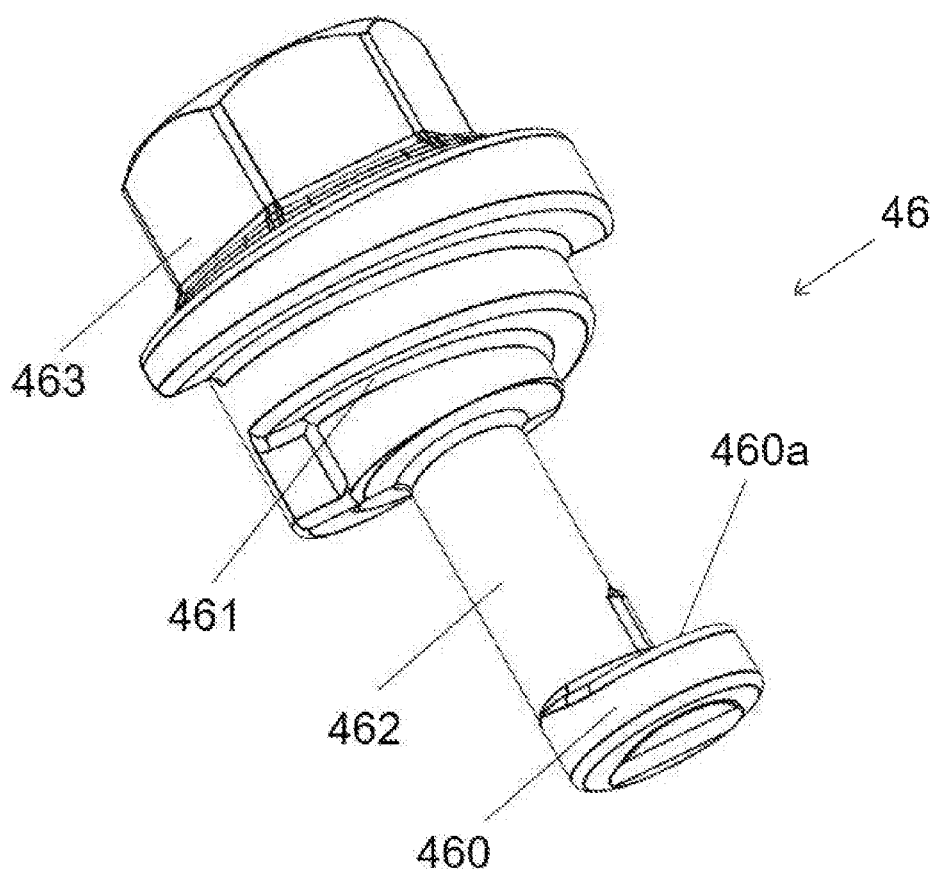
FIG. 9 shows a perspective view of the fixing key of the front anchor of FIG. 4.

In this embodiment, the fixing key 46, shown in detail in FIG. 9, comprises a shank 462, a first end of the shank 462 being fixed to the stop surface 461 and a second end of the shank 462 being fixed to the off-centered stop 460. The fixing key 46 also comprises a handle 463 after the stop surface 461. The handle 463 of the fixing key 46 projects from the fixing housing 48 of the fixed part 44 such that the operator can comfortably operate the fixing key 46.

In this embodiment, the fixing housing 48 of the fixed part 44 comprises a retaining element 481 that prevents the fixing key 46 from being separated from the fixing housing 48. The fixing housing 48 comprises a prolongation 482 after the guide surface 480, the retaining element 481 being arranged in the prolongation 482. In this embodiment, the retaining element 481 is a shaft that is transversely arranged in the prolongation 482. The retaining element 481 makes it impossible to separate the fixing key 46 with respect to the front anchor 4, and therefore makes the operator's job easier.

In other embodiments, the housing can comprise retaining elements of other types that prevent the fixing key from being separated from the housing.

As seen in FIGS. 10 to 12, in this embodiment, the retaining element 481 is arranged in the prolongation 482 such that it allows the off-centered stop 460 of the fixing key 46 to be housed entirely inside the prolongation 482 without projecting from the inner face 441 of the fixed part 44 of the front anchor 4, as it can be seen in FIGS. 6 and 10.

The fact that the fixing key 46 does not project from the inner face 441 of the fixed part 44 of the front anchor 4 makes it easier to assemble the front anchor 4, since the operator can bring the front anchor 4 closer until it is supported on the front formwork panel 2, and then introduce and turn the fixing key 46 in the hole 210 of the front formwork panel 2 for fixing the front anchor 4 to the front formwork panel 2. Otherwise the operator has to fix a threaded end 60 of the tie rod 6 to the rear anchor 5 and in the same time dispose the fixing key 46 in the first angular position so it can enter in the hole 210 of the supporting wall 25 of the front formwork panel 2.

In this embodiment, the prolongation 482 of the fixing housing 48 and the off-centered stop 460 are cylindrical. The diameter of the prolongation 482 is the same as the diameter of the off-centered stop 460. It is thereby achieved that the supporting face 460a of the off-centered stop 460 of the fixing key 46 that is supported on the inner face 25a of the supporting wall 25 of the structure 21 of the front formwork panel 2 is maximum. In other embodiments, the diameter of the prolongation 482 could be greater than the diameter of the off-centered stop 460.

In this embodiment, the shank 462 of the fixing key 46 is also cylindrical. The diameter of the shank 462 is less than the diameter of the off-centered stop 460. The diameter of the shank 462 has to be smaller than the gap located between the retaining element 481 and the wall of the prolongation 482 of the fixing housing 48 so that the fixing key 46 can turn correctly between the first and second angular positions and vice versa.

Figure 23:
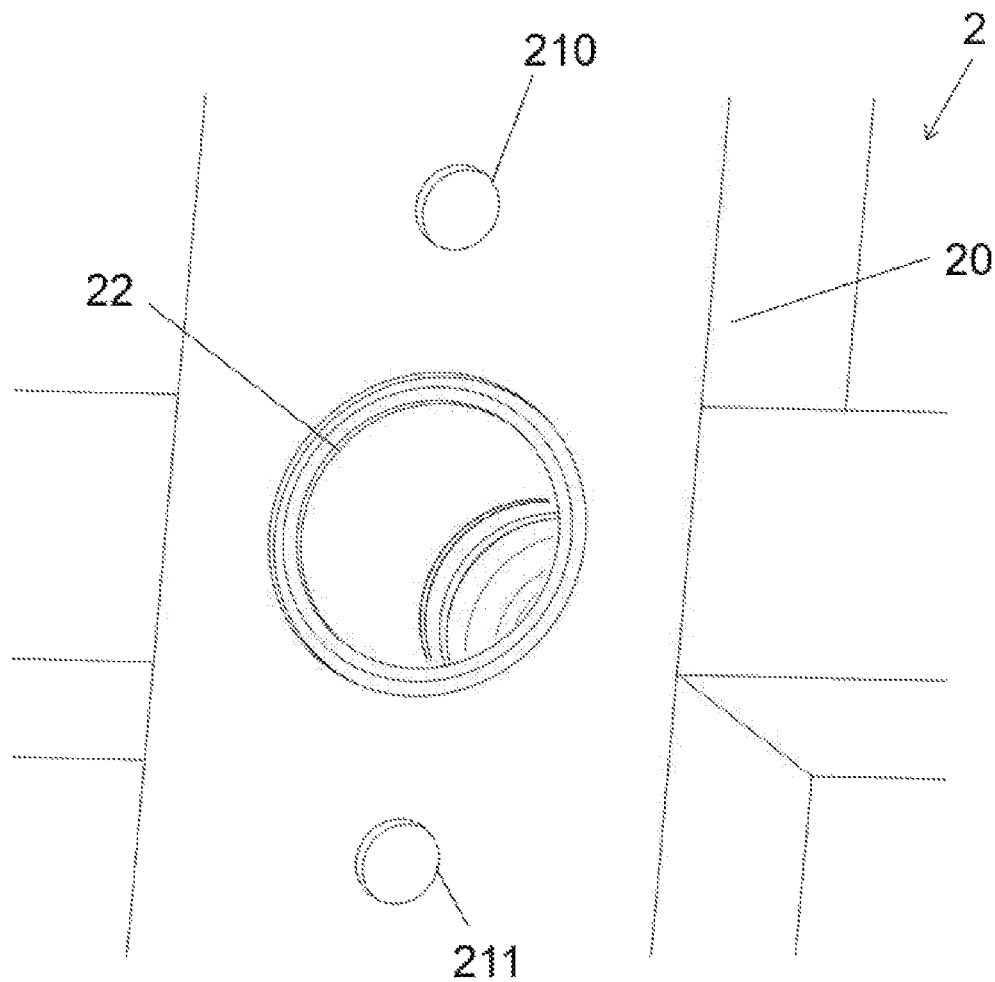
FIG. 23 shows a detailed view of the structure of the front formwork panel of the vertical formwork of FIG. 1.

In this embodiment, in addition to the fixing key 46, the fixed part 44 comprises a pin 47 suitable for being housed in a second hole 211 of the front formwork panel 2. The pin 47 projects from the inner face 441 of the fixed part 44. The supporting wall 25 of the front formwork panel 2 comprises a second hole 211 in which the pin 47 can be housed. Therefore, when the pin 47 is housed in the second hole 211 of the supporting wall 25 of the front formwork panel 2, it collaborates in fixing the front anchor 4. It specifically prevents the front anchor 4 from being able to rotate with respect to the corresponding front formwork panel 2. FIG. 23 shows the holes 210 and 211 of the supporting wall 25 of the front formwork panel 2 in which the front anchor 4 is fixed.

In other possible embodiments, the front anchor 4 can comprise other ways of assuring that the front anchor 4 does not rotate with respect to the front formwork panel 2. For example, the front anchor 4 can comprise two pins projecting from the inner face of the fixed part and cooperating with two opposite ends of a profile of the structure of the front formwork panel in which the front anchor is fixed. In another possible embodiment, the front anchor 4 could comprise two fixing keys having the features described above, each of the fixing keys being housed in a respective hole of the front formwork panel 2.

In this embodiment, the fixed part 44 of the front anchor 4 comprises a spherical part with an opening. The front anchor 4 also comprises a body 45 which is arranged in the opening of the spherical part of the fixed part 44. The body 45 comprises a first part having a spherically-shaped support wall coupled like a ball and socket joint to the spherical part of the fixed part 44, and a tubular extension after the first part.

In this embodiment, the body 45 of the front anchor 4 comprises the housing 400 of the front anchor 4.

As mentioned above, the first part of the body 45 has clearance like a ball and socket joint with the spherical part of the fixed part 44 in which the body 45 is arranged. This assures that when the outlet openings 220 and 320 of the bushings 22 and 32 of the front formwork panel 2 and the rear formwork panel 3 are not altogether aligned and therefore the tie rod 6 is arranged obliquely, the support wall of the body 45 is supported in its entirety on the fixed part 44.

The rear anchor 5 of this embodiment, shown in detail in the FIGS. 14 to 17, comprises a housing 510 suitable for receiving a second end 60 of the tie rod 6, particularly a threaded end of the tie rod 6.

The rear anchor 5 further comprises a fixed part 50 suitable for being fixed to a supporting wall 35 of the rear formwork panel 3 and fixing means for fixing the fixed part 50 to the supporting wall 35 of the rear formwork panel 3.

In this embodiment, the fixed part 50 of the rear anchor 5 is supported on a supporting wall 35 of the rear formwork panel 3.

The fixing means comprises a fixing key 56 suitable for being housed in a hole 310 of the supporting wall 35 of the rear formwork panel 3. The fixing key 56 has the function that the screw has in anchors known in the prior art.

Figure 18:
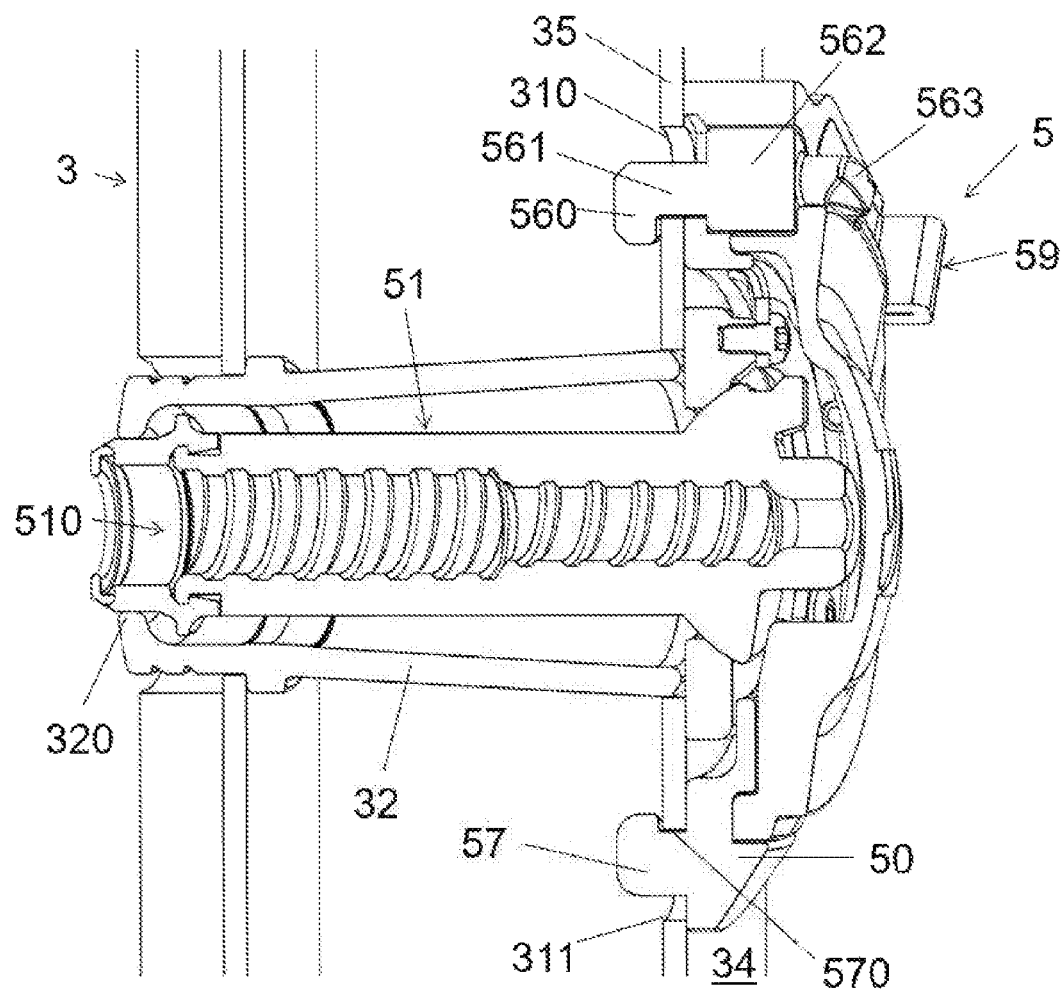
FIG. 18 shows a section view of the rear anchor of FIG. 14 fixed to the rear formwork panel.
Figure 19:
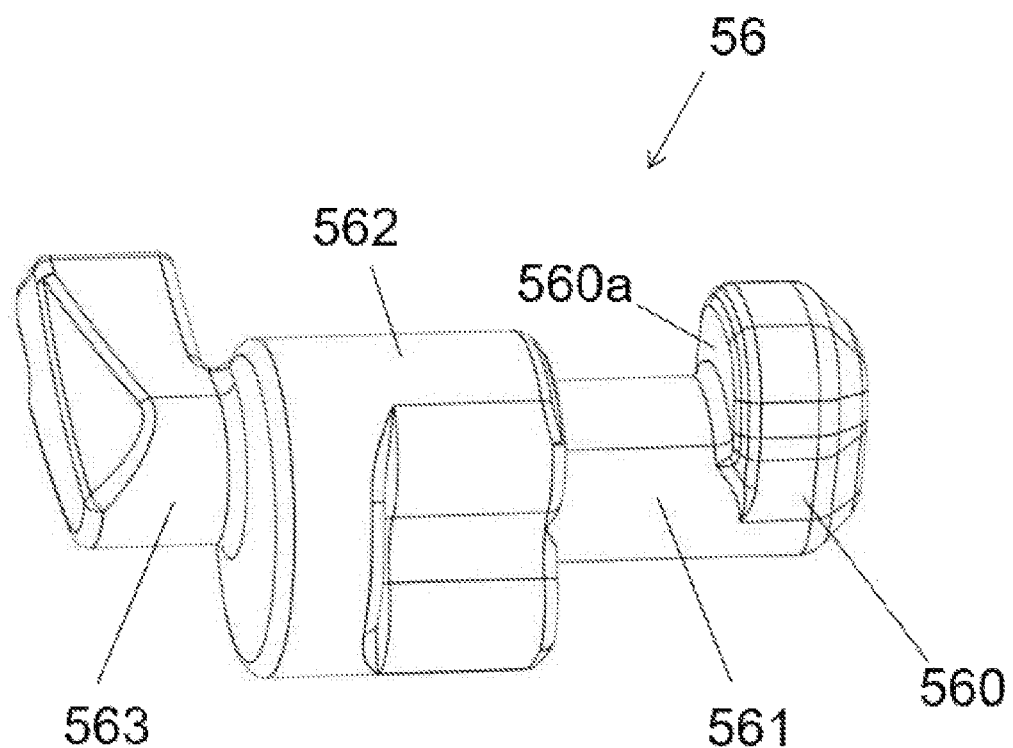
FIG. 19 shows a perspective view of the fixing key of the rear anchor of FIG. 14.
Figure 20:
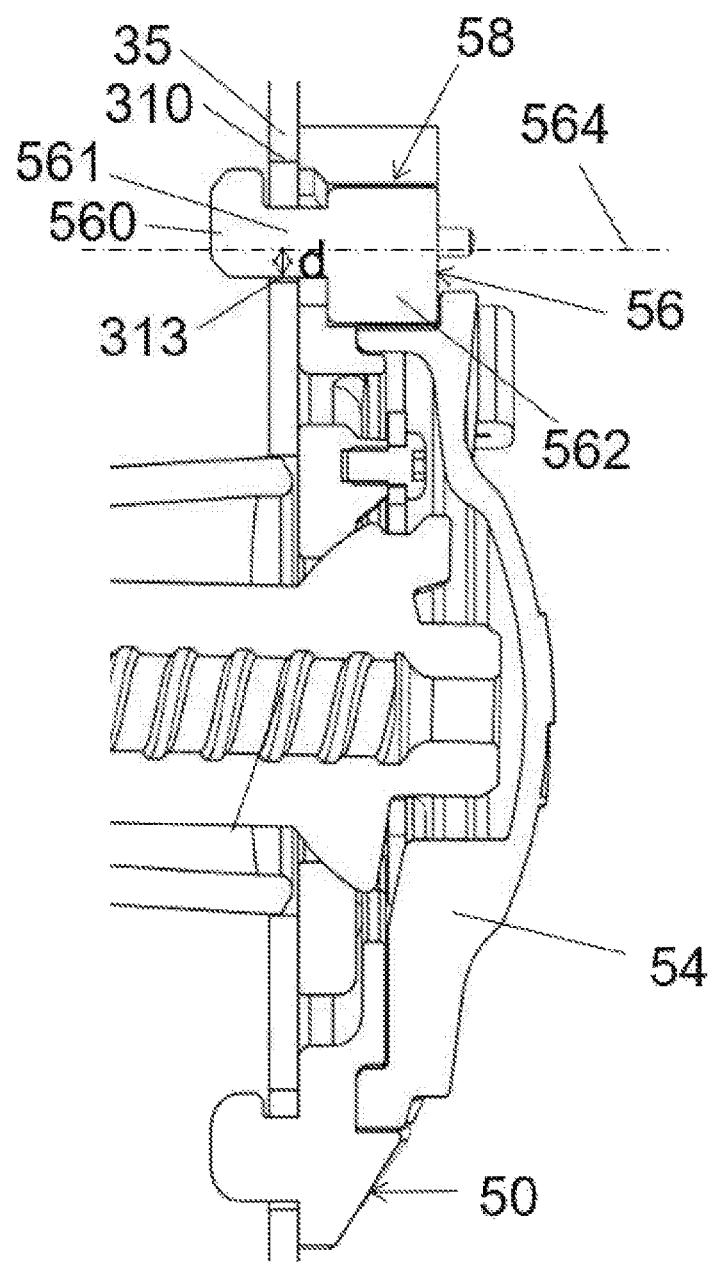
FIG. 20 shows a section view of the rear anchor of FIG. 14 with the fixing key housed in the hole of the rear formwork panel and the pin housed in the second hole of the rear formwork panel, the fixing key being in the first angular position.
Figure 21:
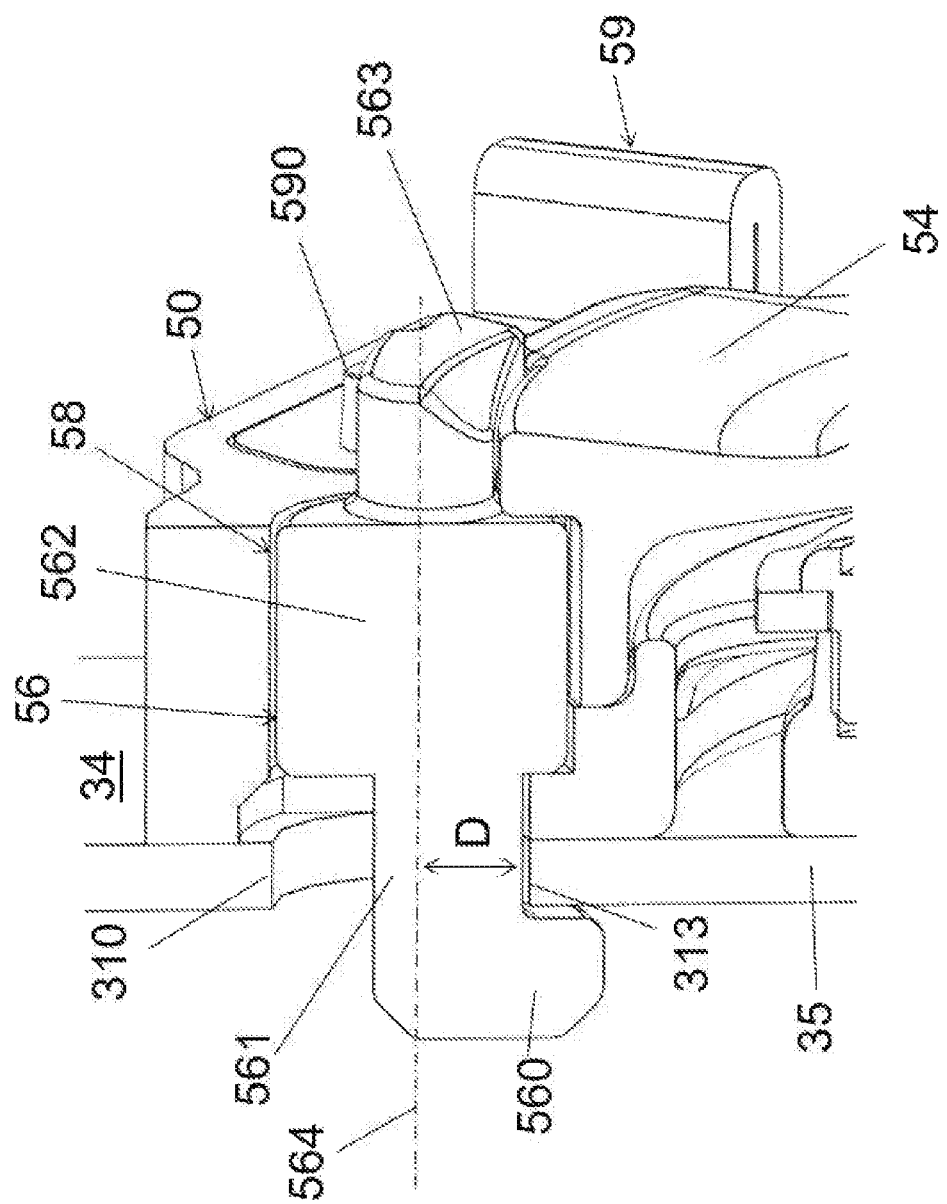
FIG. 21 shows a detailed section view of the rear anchor of FIG. 14 with the fixing key housed in the hole of the rear formwork panel, the fixing key being in the second angular position.

The fixing key 56 comprises an off-centered stop 560 with respect to the axis of rotation 564 of the fixing key 56, such that in a first angular position, shown in detail in the FIG. 20, the off-centered stop 560 of the fixing key 56 can be introduced in the hole 310 of the supporting wall 35 of the rear formwork panel 3, and in a second angular position, shown in detail in FIGS. 18 and 21, the off-centered stop 560 is retained by the rear formwork panel 3 and therefore the rear anchor 5 is fixed to the supporting wall 35 of the rear formwork panel 3. The hole 310 of the rear formwork panel 3 has a diameter greater than or equal to the diameter of the off-centered stop 560 of the fixing key 56.

Figure 22:
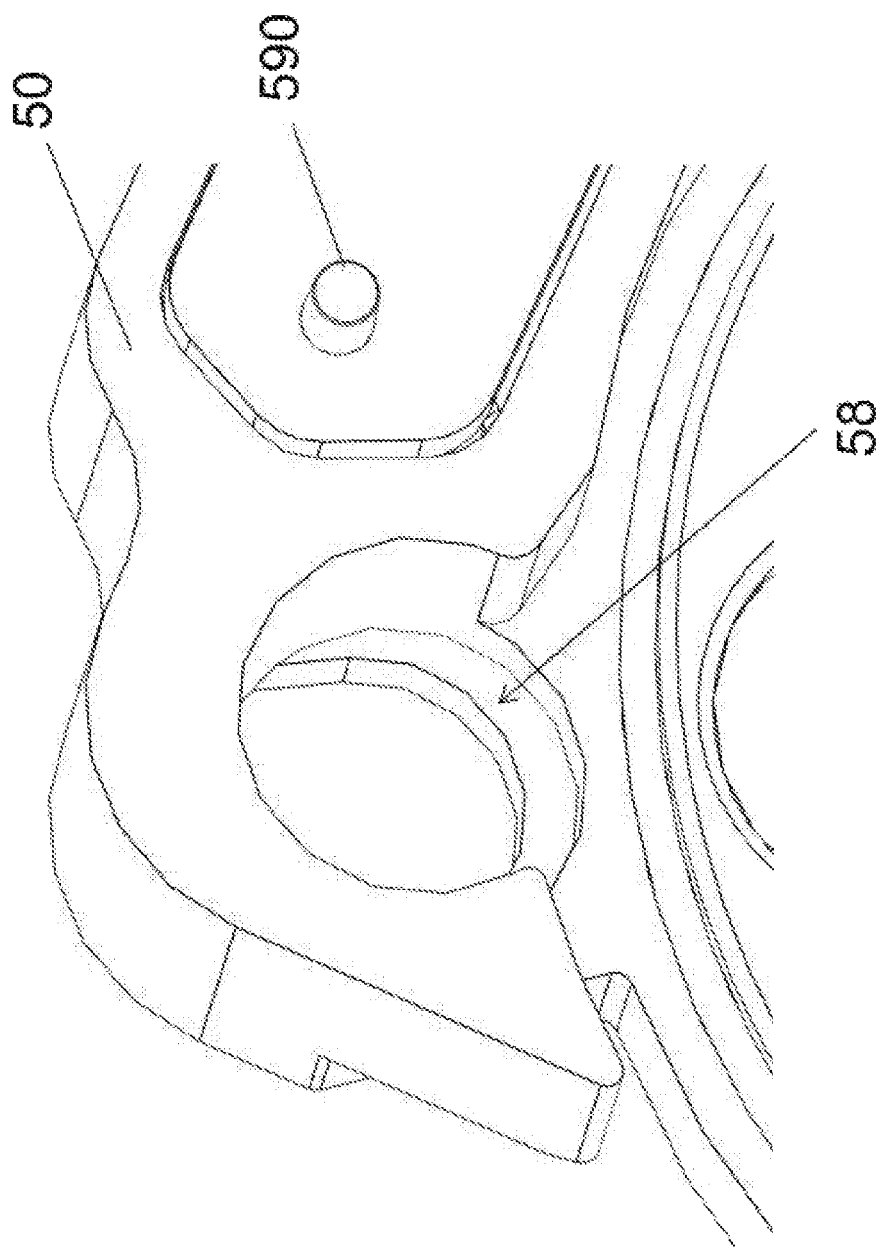
FIG. 22 shows a detailed view of the housing of the rear anchor of FIG. 14.

In this embodiment, the fixed part 50 of the front anchor 5 comprises a fixing housing 58, shown in detail in FIG. 22, in which the fixing key 56 is arranged.

In this embodiment, the fixed part 50 comprises blocking means configured to retain the fixing key 56 when the fixing key is in the second angular position, so that an involuntary turning of the fixing key 56 is avoided.

Figure 14:
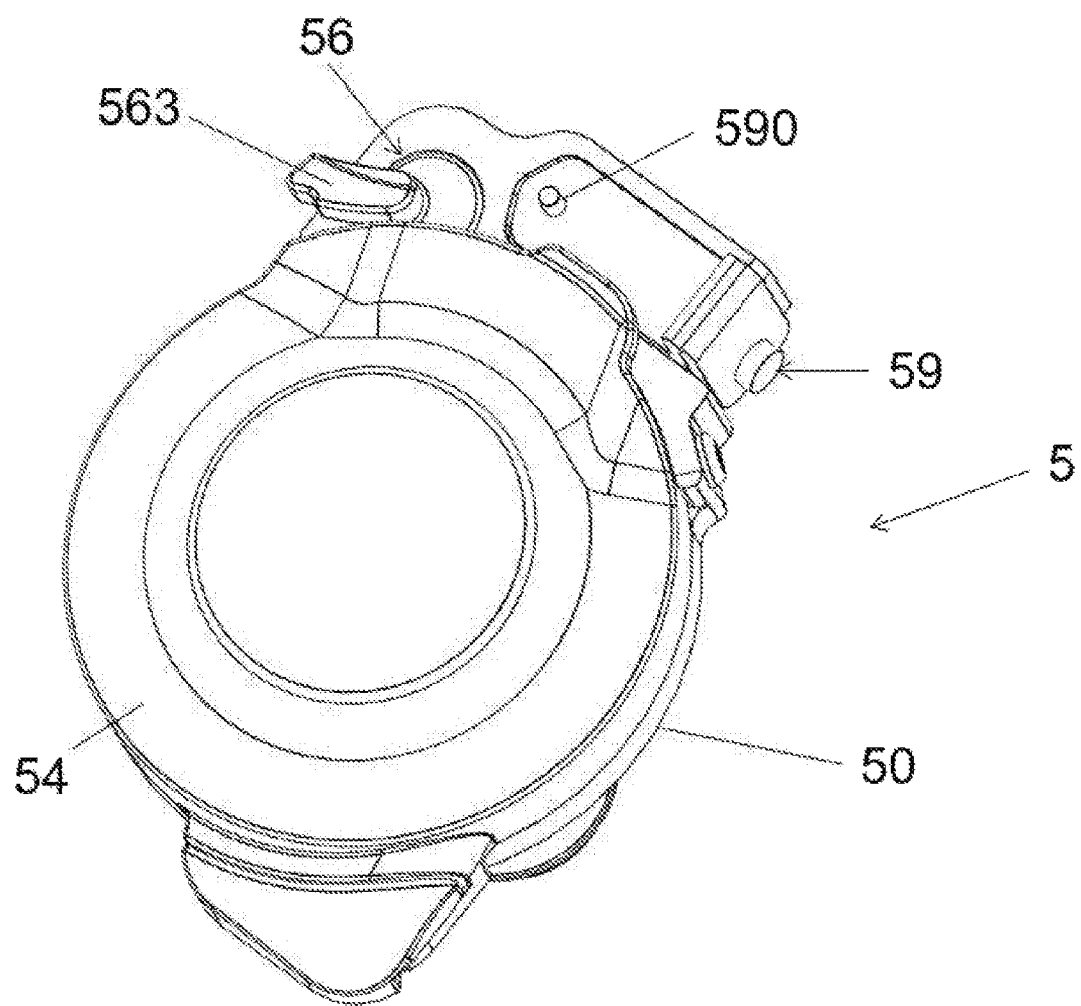
FIG. 14 shows a first perspective view of the rear anchor of the vertical formwork of FIG. 1.

In this embodiment, fixing key 56 comprises a handle 563 which projects from the fixing housing 58 of the fixed part 50 such that the operator can comfortably operate the fixing key 56. FIG. 14 shows the position of the handle when the fixing key 56 is in the first angular position, and FIGS. 15 and 16 show the position of the handle 563 when the fixing key 56 is in the second angular position.

Figure 15:
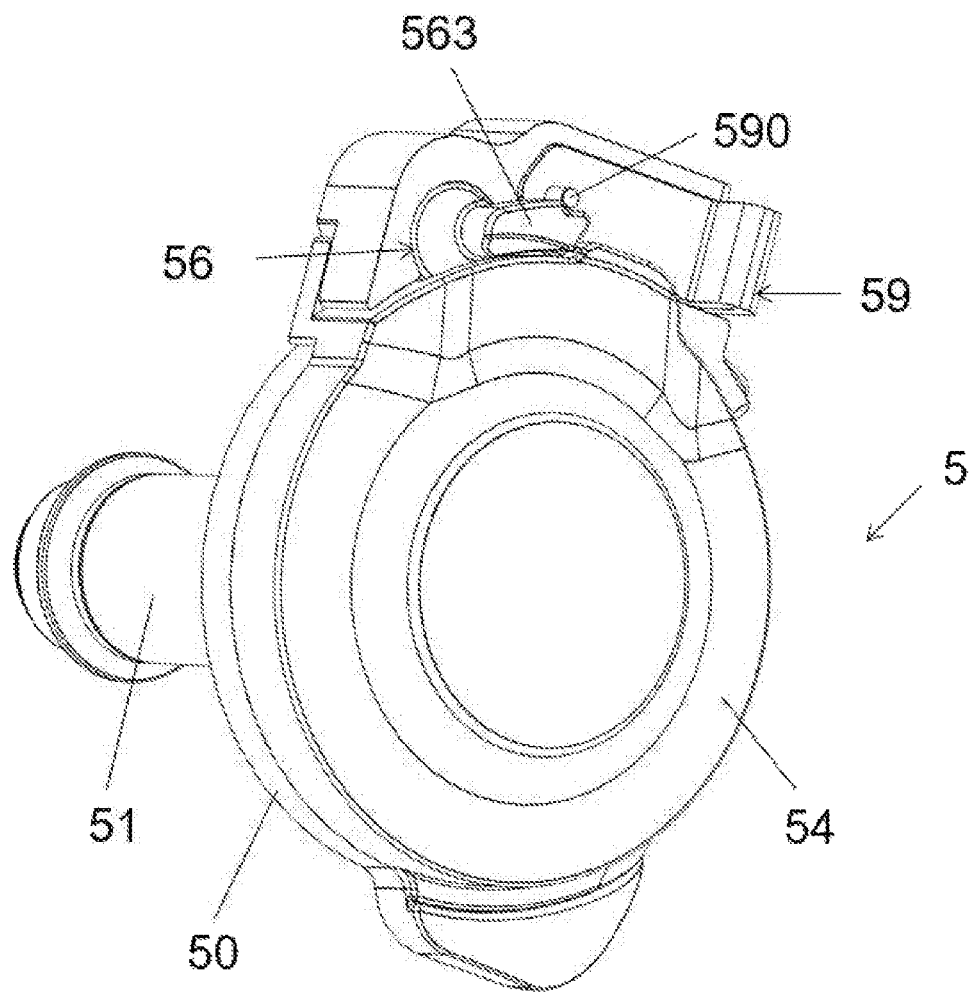
FIG. 15 shows a second perspective view of the rear anchor of FIG. 14.
Figure 16:
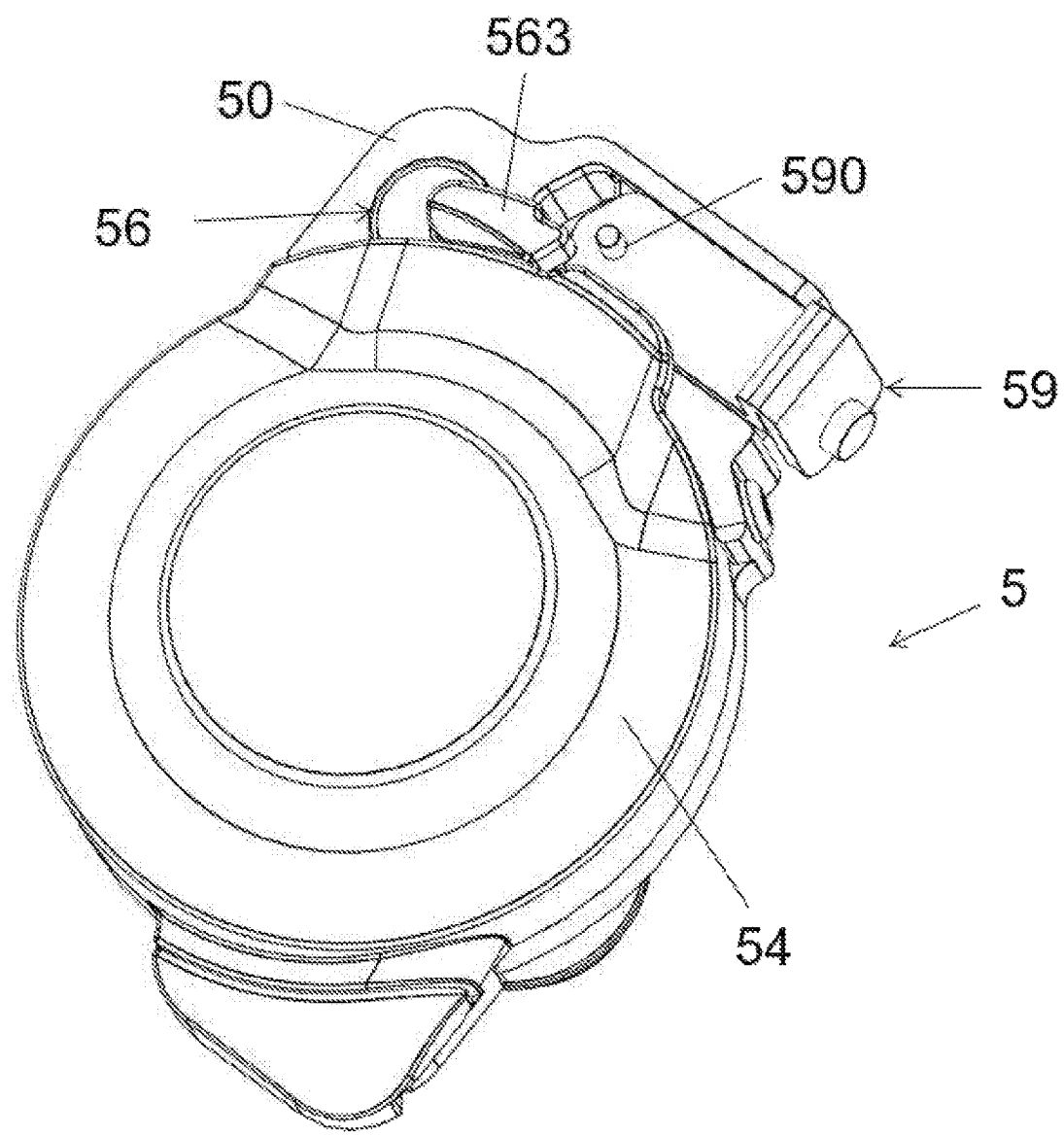
FIG. 16 shows a third perspective view of the rear anchor of FIG. 14.
Figure 17:
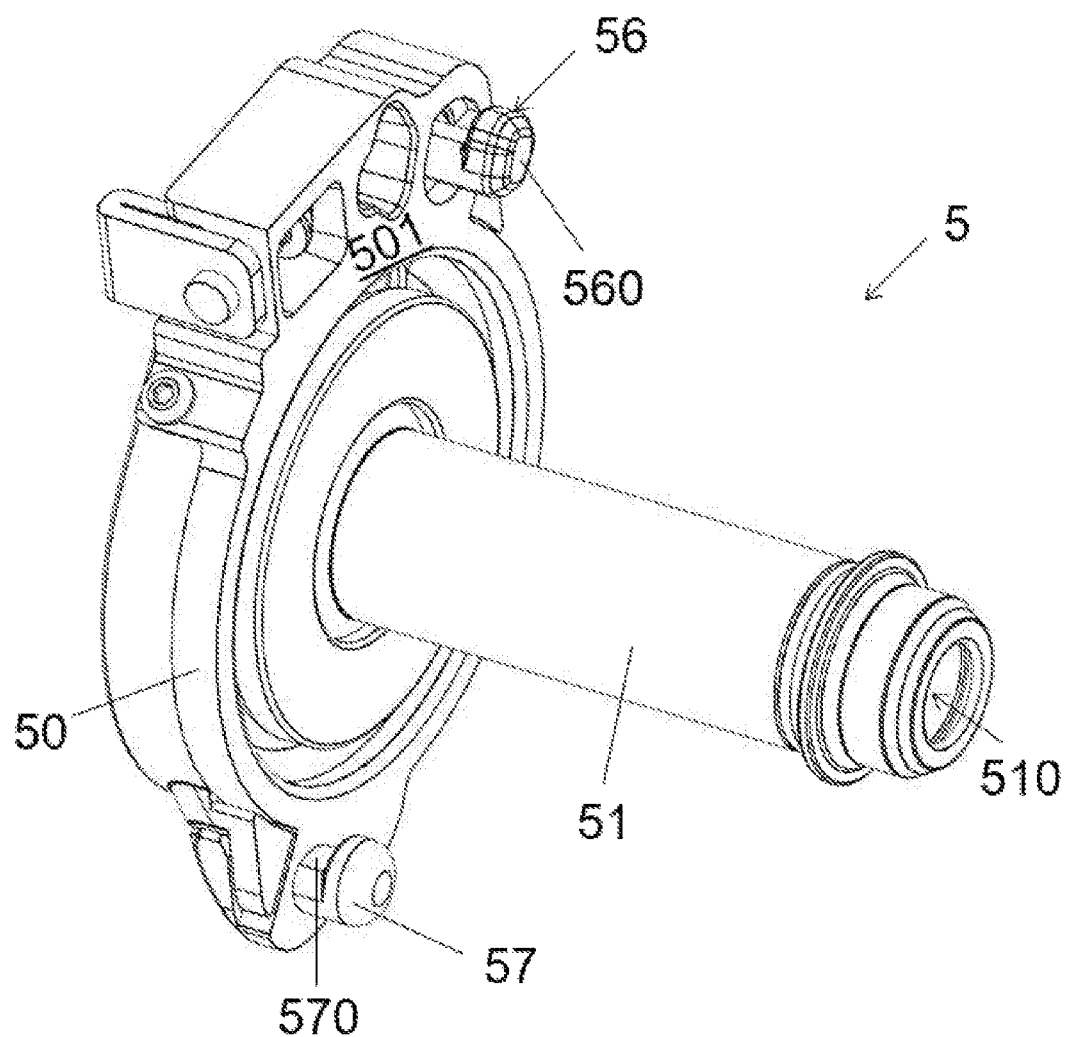
FIG. 17 shows a fourth perspective view of the front anchor of FIG. 14.

In this embodiment, the blocking means comprises a blocking element 59 comprising a stop member 590 configured to block the handle 563 of the fixing key 56 when the stop member 590 is arranged in a blocking position and the fixing key 56 is disposed in the second angular position, as it can be seen in FIG. 15.

Figure 24:
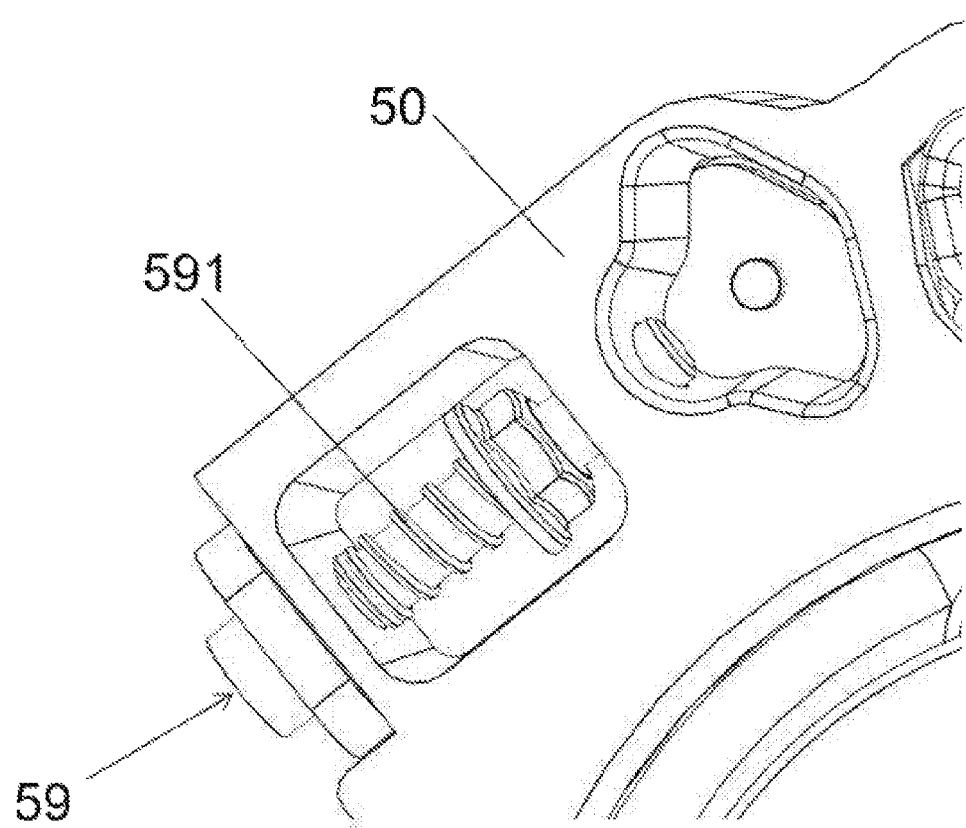
FIG. 24 shows a detailed view of fixed part of the rear anchor of FIG. 14.

In this embodiment the blocking element 59 is coupled movably to the fixed part 50 of the rear anchor 5. Preferably the blocking element 59 is coupled to the fixed part 50 of the rear anchor 5 by means of elastic means, the elastic means pushing the stop member 590 to the blocking position. In this embodiment the elastic means comprises a spring 591 shown in FIG. 24. The spring maintains the stop member 590 in the blocking position. If the blocking element 59 is pulled, as it can be seen in 16, the handle 563 of the fixing key 56 can be turned back to the first angular position. Thanks to the blocking element 59, two simultaneous movements are needed to turn back the fixing key 56 from the second angular position to the first angular position. First, the blocking element 59 has to be pulled, and maintaining the blocking element 59 pulled, the fixing key 56 has to be turned back.

In other possible embodiments the stop member 590 can be maintained in the blocking position by other means, for example a magnet.

In this embodiment, in addition to the fixing key 56, the fixed part 50 comprises a pin 57 suitable for being housed in a second hole 311 of the supporting wall 35 of the rear formwork panel 3. The pin 57 projects from the inner face 501 of the fixed part 50. The supporting wall 35 of the rear formwork panel 3 comprises a second hole 311 in which the pin 57 can be housed. Therefore, when the pin 57 is housed in the second hole 311 of the rear formwork panel 3, it collaborates in fixing the rear anchor 5. It specifically prevents the rear anchor 5 from being able to rotate with respect to the corresponding rear formwork panel 3.

In other possible embodiments, the rear anchor can comprise other ways of assuring that the rear anchor does not rotate with respect to the rear formwork panel. For example, the rear anchor can comprise two pins projecting from the inner face of the fixed part and cooperating with two opposite ends of a profile of the structure of the rear formwork panel in which the rear anchor is fixed.

In this embodiment, in order to achieve a better fixing of the rear anchor 5 to the rear formwork panel 3, the pin 57 in addition to avoid the rotation of the rear anchor 5, it is also fixed to the supporting wall 35 of the rear formwork panel 3 when the fixing key 56 is disposed in the second angular position. When the operator working from the front side of the vertical formwork 1 wants to fix the threaded end 60 of the tie rod 6 in the rear anchor 5 can bang the rear anchor 5 so it is important to achieve a good fixing of the rear anchor 5 to the rear formwork panel 3.

In this embodiment the pin 57 comprises a lateral groove 570. When the fixing key 56 is disposed in the first angular position there is a gap between the groove 570 of the pin 57 and the supporting wall 35 of the rear the formwork panel 3, as it can be seen in FIG. 20. To eliminate the gap, the anchor 5 is configured to move upward when the fixing key 56 turns from the first angular position to the second angular position, the supporting wall 35 entering the groove 570 of the pin 57 when the anchor 5 moves upward, the pin 57 being retained by the supporting wall 35 when the fixing key 56 is in the second angular position.

In this embodiment, the fixing key 56 comprises a cam 561. The hole 310 of the supporting wall 35 is traversed by the cam 561 of the fixing key, the cam 561 resting on a supporting surface 313 of the hole 310 of the supporting wall 35. The supporting surface 313 is part of the opening that defines the hole 313 of the supporting wall 35 where the fixing key 56 is housed. As it can be seen in FIGS. 20 and 21, the distance D from the axis of rotation 564 of the fixing key 56 to the supporting surface 313 is greater when the fixing key 56 is in the second angular position than the distance d from the axis of rotation 564 to the supporting surface 313 when the fixing key 56 is in the first angular position.

In this embodiment, the cam 561 of the fixing key 56 is arranged between the off-centered stop 560 and a substantially cylindrical part 562 of the fixing key 56. The axis of the cylindrical part 562 is the axis of rotation 564 of the fixing key 56. The cylindrical part 562 is housed in the fixing housing 58 of the fixed part 50.

In this embodiment, the rear anchor 5 comprises a nut 51 comprising the housing 510 of the rear anchor 5. The nut 51 can be oriented with respect to the fixed part 50, such that if the outlet openings 220 and 320 of the bushings 22 and 32 of the front formwork panel 2 and the rear formwork panel 3 are not altogether aligned and therefore the tie rod 6 is arranged obliquely, the nut 51 can adapt its orientation to fix the second end 61 of the tie rod 6.

In this embodiment the rear anchor 5 comprises a lid 54 removably coupled to the fixed part 50. When the lid 54 is coupled to the fixed part 50, the lid 54 prevents the fixing key 56 from being separated from the fixing housing 58 of the fixed part 50 as it can be seen in FIGS. 20 and 21, so that makes it impossible to lose the fixing key 56 with respect to the rear anchor 5, and therefore makes the operator's job easier.

In other possible embodiments, not shown in the figures, the fixing means of the rear anchor can be the same of the fixing means of the front anchor described in this document.

In other possible embodiments, not shown in the figures, the fixing means of the front anchor can be the same of the fixing means of the rear anchor described in this document.

The following clauses disclose in an unlimited way additional implementations with each clause representing one or more implementations.

Clause 1: An anchor for a vertical formwork comprising:
a fixed part (44, 50) suitable for being fixed to a formwork panel (2, 3) and
fixing means for fixing the fixed part (44, 50) to the formwork panel (2, 3),
the fixing means comprise a fixing key (46, 56) arranged in a fixing housing (48, 58) of the fixed part (44, 50), the fixing key (46, 56) being configured for being housed in a hole (210, 310) of a supporting wall (25, 35) of the formwork panel (2, 3), the fixing key (46, 56) comprising an off-centered stop (460, 560) with respect to the axis of rotation (464, 564) of the fixing key (46, 56), such that in a first angular position the off-centered stop (460, 560) of the fixing key (46, 56) can be introduced in the hole (210, 310) of the formwork panel (2, 3), and in a second angular position the off-centered stop (460, 560) is retained by the formwork panel (2, 3) and therefore the anchor (4, 5) is fixed to the formwork panel (2, 3).

Clause 2: The anchor according to clause 1, wherein the fixing means comprise backward motion means cooperating with the fixing key (46), such that when the fixing key (46) turns from the first angular position to the second angular position, the backward motion means make the fixing key (46) move backwards, and therefore in the second angular position the fixing key (46) is supported against the formwork panel (2).

Clause 3: The anchor according to clause 2, wherein the backward motion means comprise a guide surface (480) arranged in the fixing housing (48) of the fixed part (44), and the fixing key (46) comprises a stop surface (461), the guide surface (480) and the stop surface (461) cooperating such that the fixing key (46) axially moves backwards when turning.

Clause 4: The anchor according to clause 3, wherein the guide surface (480) and the stop surface (461) are helical surfaces.

Clause 5: The anchor according to any of the preceding clauses, wherein the fixing housing (48) comprises a retaining element (481) that prevents the fixing key (46) from being separated from the fixing housing (48).

Clause 6: The anchor according to clause 5, wherein the retaining element (481) is arranged in the fixing housing (48) such that it allows the off-centered stop (460) of the fixing key (46) to be housed inside the housing (48) without projecting from the inner face (441) of the fixed part (44) of the anchor (4).

Clause 7: The anchor according to clause 1, wherein the fixed part (50) comprises blocking means configured to retain the fixing key (56) when the fixing key (56) is in the second angular position, so that an involuntary turning of the fixing key (56) is avoided.

Clause 8: The anchor according to clause 7, wherein the fixing key (56) comprises a handle (563), the blocking means comprising a blocking element (59) comprising a stop member (590) configured to block the handle (563) in a blocking position, the blocking element (59) being coupled movably to the fixed part (50) of the anchor (5).

Clause 9: The anchor according to clause 8, wherein the blocking element (59) is coupled to the fixed part (50) by means of elastic means, the elastic means pushing the stop member (590) to the blocking position.

Clause 10: The anchor according to any of the preceding clauses, wherein the fixed part (44, 50) comprises a pin (47, 57) suitable for being housed in a second hole (211, 311) of the supporting wall (25, 35) of the formwork panel (2, 3).

Clause 11: The anchor according to clause 10, wherein the pin (57) comprises a lateral groove (570) and the anchor (5) is configured to move upward when the fixing key (56) turns from the first angular position to the second angular position, the supporting wall (35) entering the groove (570) of the pin (57) when the anchor (5) moves upward, the pin (57) being retained by the supporting wall (35) when the fixing key (56) is in the second angular position.

Clause 12: The anchor according to clause 11, wherein the fixing key (56) comprises a cam (561) that rests on a supporting surface (313) of the hole (310) of the supporting wall (35) that is traversed by the fixing key (56), the distance (D) from the axis of rotation (564) of the fixing key (56) to the supporting surface (313) being greater when the fixing key (56) is in the second angular position than the distance (d) from the axis of rotation (564) to the supporting surface (313) when the fixing key (56) is in the first angular position.

Clause 13: The anchor according to clause 12, wherein the cam (561) of the fixing key (56) is arranged between the off-centered stop (560) and a substantially cylindrical part (562) of the fixing key (56), the axis of the cylindrical part (562) being the axis of rotation (564) of the fixing key (56), and the cylindrical part (562) being housed in the fixing housing (58) of the fixed part (50).

Clause 14: A vertical formwork comprising at least
two formwork panels (2, 3) which are arranged facing one another, each of the formwork panels (2, 3) comprising at least one hole (210, 310) for fixing an anchor (4, 5), and
an anchor (4, 5) according to any of the preceding clauses fixed to each of the formwork panels (2, 3).

What is claimed is:

1. An anchor for a vertical formwork that includes a formwork panel having an outer face and an inner face, the outer face comprising a part of a supporting wall that includes a first through hole, the supporting wall having a first side corresponding to the outer face of the formwork panel and a second side opposite the first side, the first through hole extending between the first and second sides of the supporting wall, the anchor comprising:
    a fixed part configured to be fixed to the supporting wall of the formwork panel, the fixed part including a housing having a helical guide surface; and
    a fixing key arranged in the housing of the fixed part, the fixing key rotatable about an axis of rotation and including a handle and an off-centered stop coupled to the handle by a shank, the handle configured to reside on the first side of the supporting wall, the off-centered stop including a protruding part that protrudes in a direction transverse to the axis of rotation, the fixing key rotatable between a first angular position and a second angular position, the protruding part of the off-centered stop including a supporting face that is configured to face and be supported against the second side of the supporting wall to fix the anchor to the formwork panel when the fixing key is in the second angular position, when the fixing key is in the first angular position the supporting face of the protruding part of the off-centered stop assumes a first axial position with there being a gap between the supporting face and the second side of the supporting wall, when the fixing key is rotated to the second angular position the supporting face of the protruding part of the off-centered stop assumes a second axial position to abut against the second side of the supporting wall, the fixing key including a helical stop surface that is configured to cooperate with the helical guide surface of the housing of the fixed part to cause the supporting face of the off-centered stop to move between the first and second axial positions when the fixing key is respectively rotated between the first and second angular positions.

2. The anchor according to claim 1, wherein the fixing key comprises a single off-centered stop located at a terminal end of the shank.

3. The anchor according to claim 1, wherein when the fixing key is in the second angular position, a static force between the guide surface of the housing and the stop surface of the fixing key maintains the fixing key in the second angular position.

4. The anchor according to claim 1, wherein the fixing key has a proximal end at which resides the handle and a distal end at which resides the off-centered stop, the helical stop surface of the fixing key being located between a distal end of the handle and a proximal end of the shank.

5. The anchor according claim 1, wherein a retaining element is disposed inside the housing of the fixed part that prevents the fixing key from being separated from the fixed part.

6. The anchor according to claim 5, wherein the fixed part has an inner face that is configured to rest against the outer face of the formwork panel, the retaining element being arranged in the housing of the fixed part in a manner that allows the off-centered stop of the fixing key to be housed entirely inside the housing without projecting from the inner face of the fixed part.

7. The anchor according to claim 1, further comprising a blocking element configured to prevent a rotation of the fixing key when the fixing key is in the second angular position.

8. The anchor according to claim 7, wherein the blocking element includes a stop member configured to block a rotation of the handle of the fixing key in a blocking position.

9. The anchor according to claim 8, wherein the blocking element is moveable in the fixed part to position the stop member between the blocking position and a non-blocking position.

10. The anchor according to claim 9, wherein the blocking element is constantly acted on by an elastic element to cause the stop member to be constantly urged toward the blocking position.

11. The anchor according to claim 10, wherein the elastic element is a spring.

12. The anchor according to claim 1, wherein the fixed part has an inner face that is configured to rest against the outer face of the formwork panel, the fixed part including a pin that protrudes from the inner face of the fixed part, the pin configured to reside in a second through hole of the supporting wall.

13. The anchor according to claim 1, further comprising a lid that is removably coupled to the fixed part, the lid being configured to prevent the fixing key from being separated from the housing when the lid is coupled to the fixed part.

* * * * *